United States Patent
Han et al.

(10) Patent No.: US 12,370,746 B2
(45) Date of Patent: Jul. 29, 2025

(54) THREE-DIMENSIONAL LAYERING CONTROL SYSTEM, THREE-DIMENSIONAL LAYER MANUFACTURING METHOD, AND THREE-DIMENSIONAL LAYERED PRODUCT MANUFACTURED THEREBY

(71) Applicant: SAMYOUNG MACHINERY CO., LTD., Gongju-si (KR)

(72) Inventors: Kuk Hyun Han, Daejeon (KR); Bong Woo Jo, Gongju-si (KR); Ju Min Park, Daejeon (KR)

(73) Assignee: SAMYOUNG MACHINERY CO., LTD., Gongju-si (KR)

(*) Notice: Subject to any disclaimer, the term of this patent is extended or adjusted under 35 U.S.C. 154(b) by 930 days.

(21) Appl. No.: 17/610,792

(22) PCT Filed: Dec. 4, 2019

(86) PCT No.: PCT/KR2019/017016
§ 371 (c)(1),
(2) Date: Nov. 12, 2021

(87) PCT Pub. No.: WO2020/230970
PCT Pub. Date: Nov. 19, 2020

(65) Prior Publication Data
US 2022/0242049 A1    Aug. 4, 2022

(30) Foreign Application Priority Data

May 13, 2019  (KR) .................. 10-2019-0055691
May 13, 2019  (KR) .................. 10-2019-0055726
May 15, 2019  (KR) .................. 10-2019-0056852

(51) Int. Cl.
*B33Y 10/00*       (2015.01)
*B29C 64/112*      (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS

2005/0280184 A1* 12/2005 Sayers ................ D21F 1/0027
264/308
2014/0246809 A1    9/2014 Hofmann et al.
(Continued)

FOREIGN PATENT DOCUMENTS

JP      2019025865 A    2/2019
KR      20160043872 A   4/2016
(Continued)

OTHER PUBLICATIONS

WIPO, International Search Report issued on Apr. 21, 2020.

*Primary Examiner* — Yung-Sheng M Tsui
(74) *Attorney, Agent, or Firm* — Li & Cai Intellectual Property (USA) Office

(57) ABSTRACT

The present invention relates to a 3D model dividing and layering control system and method which, in a method for forming a three-dimensional shape by spraying a layering material having a predetermined viscosity or more, minimize stringing which occurs during repeated spraying, through a nozzle, of a layering material and stopping spraying, can improve the layering rate of a three-dimensional shape, can also form the desired three-dimensional shape by layering, inside a specific material, a material having a viscosity different from that of the specific material, can readily and simultaneously form a three-dimensional shape inside each of a plurality of containers, and do not require separate washing of a nozzle and replacing of a layering (Continued)

material, and thus the present invention is suitable for a mass production process.

23 Claims, 20 Drawing Sheets

(51) Int. Cl.
*B29C 64/209* (2017.01)
*B29C 64/232* (2017.01)
*B29C 64/236* (2017.01)
*B29C 64/379* (2017.01)
*B29C 64/393* (2017.01)
*B33Y 30/00* (2015.01)
*B33Y 40/00* (2020.01)
*B33Y 50/02* (2015.01)
*B33Y 80/00* (2015.01)

(52) U.S. Cl.
CPC .......... *B29C 64/232* (2017.08); *B29C 64/236* (2017.08); *B29C 64/379* (2017.08); *B33Y 10/00* (2014.12); *B33Y 30/00* (2014.12); *B33Y 40/00* (2014.12); *B33Y 50/02* (2014.12); *B33Y 80/00* (2014.12)

(56) References Cited

U.S. PATENT DOCUMENTS

2018/0281295 A1  10/2018  Tibbits et al.
2021/0299944 A1* 9/2021  Mathea ................. B29C 64/209

FOREIGN PATENT DOCUMENTS

| KR | 20160132441 A | 11/2016 |
| KR | 101688083 B1 | 12/2016 |
| KR | 20170135323 A | 12/2017 |
| KR | 20180092786 A | 8/2018 |

* cited by examiner

[FIG. 1]
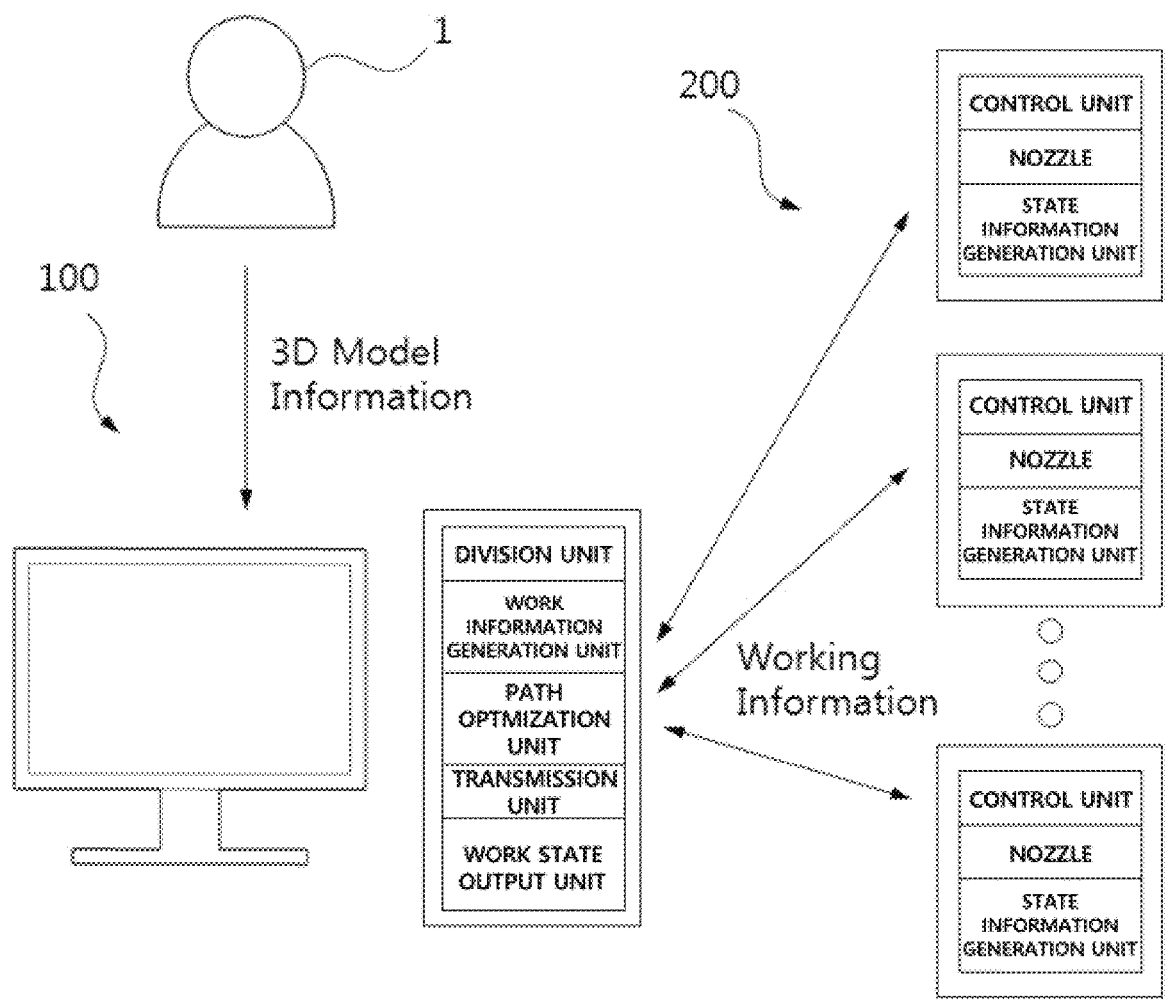

[FIG. 2]
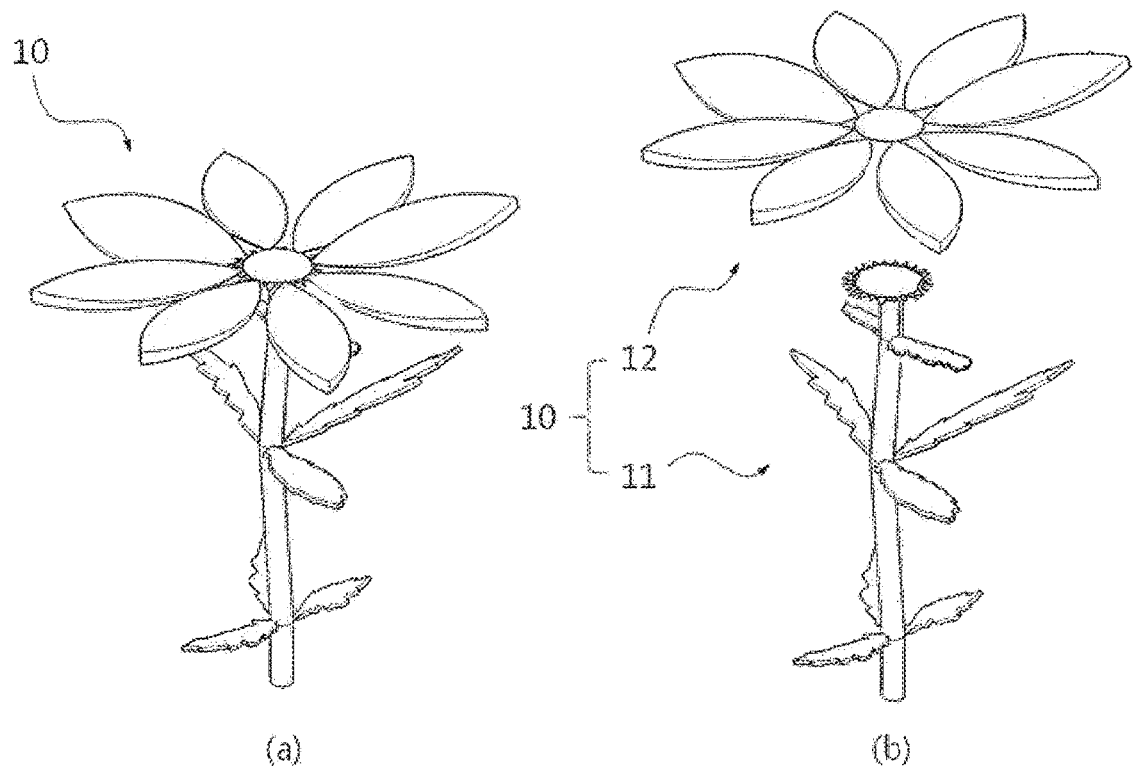

[FIG. 3]
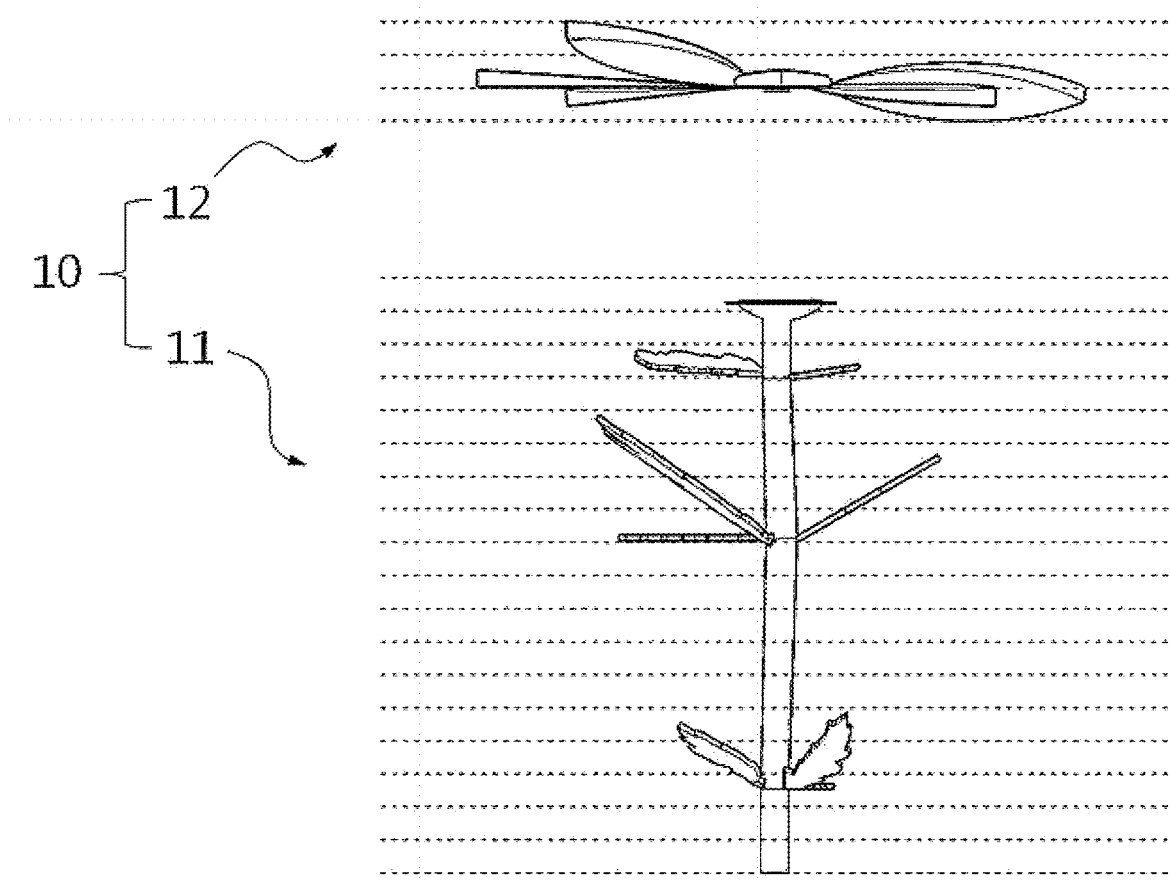

[FIG. 4]
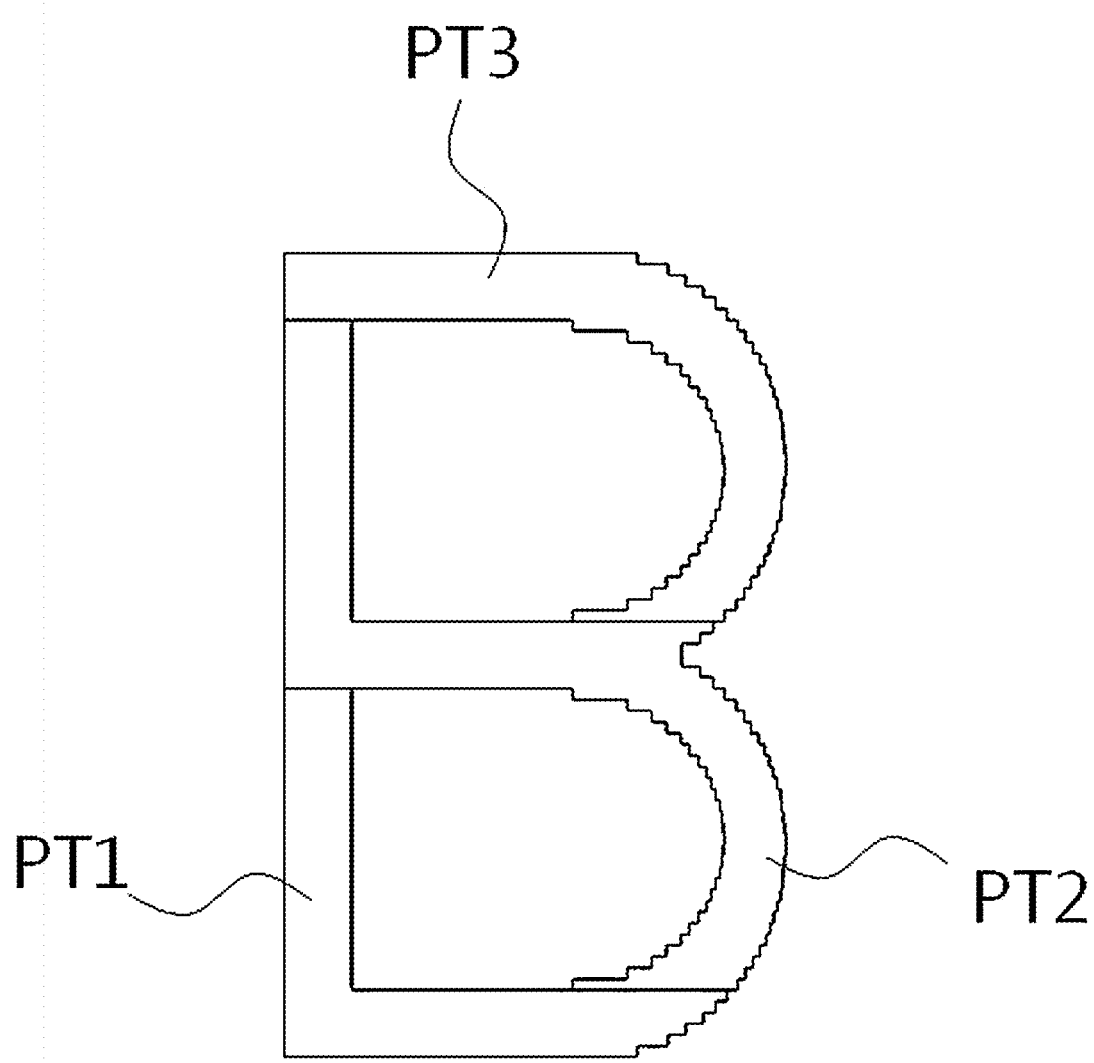

[FIG. 5]
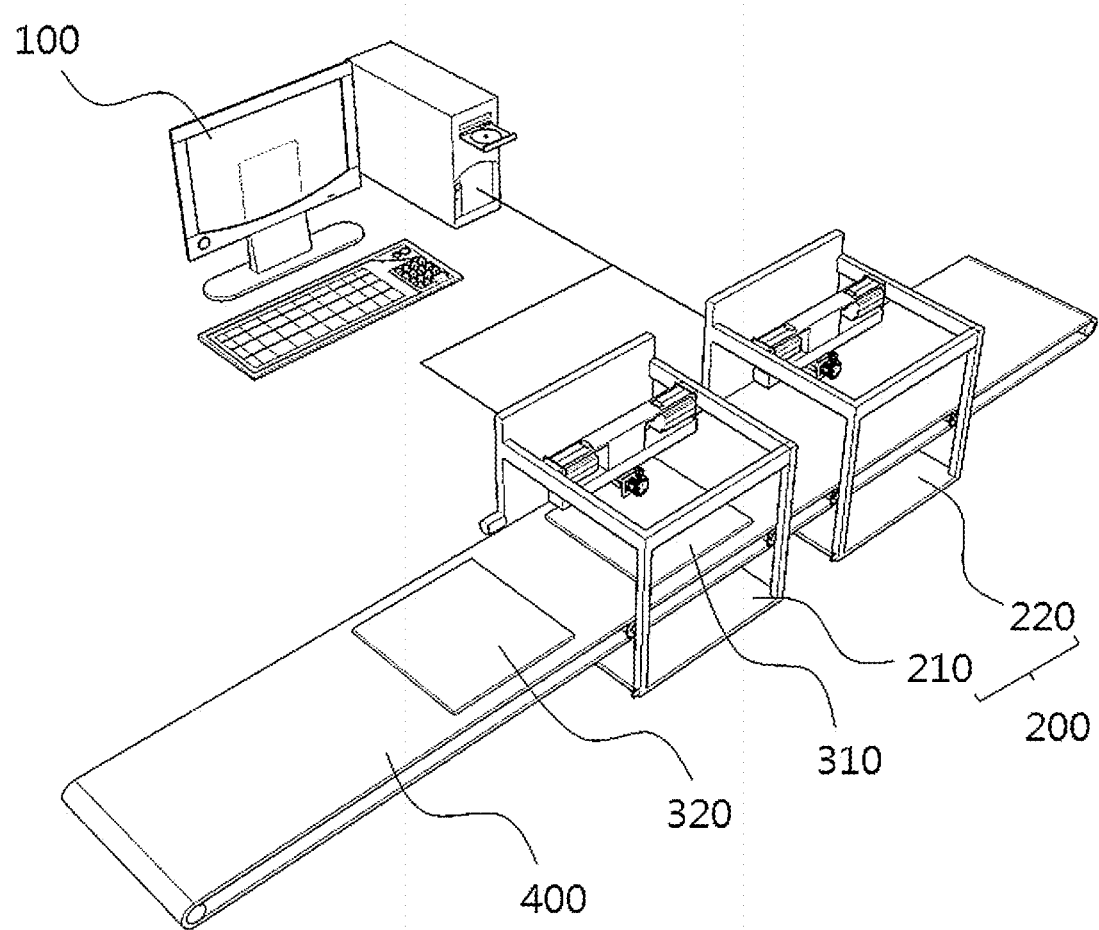

[FIG. 6]
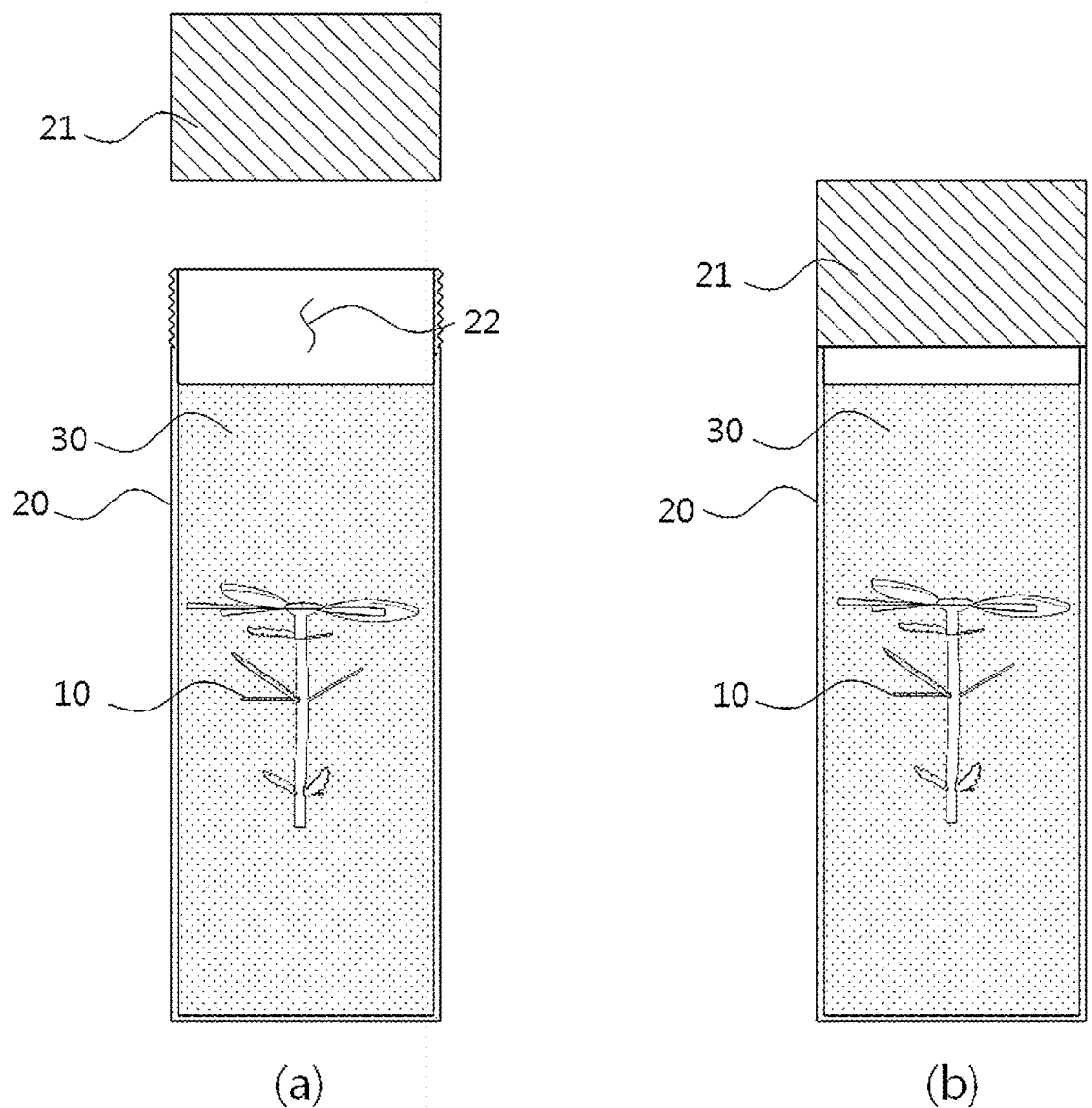

[FIG. 7]
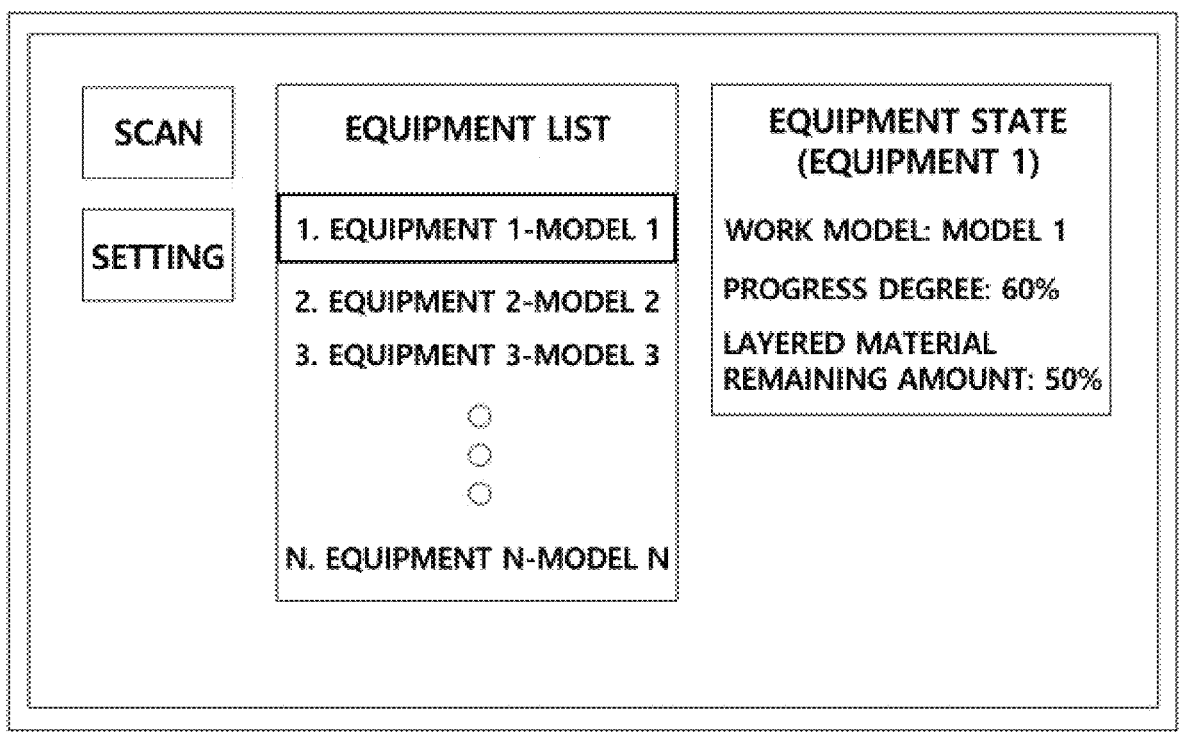

[FIG. 8]
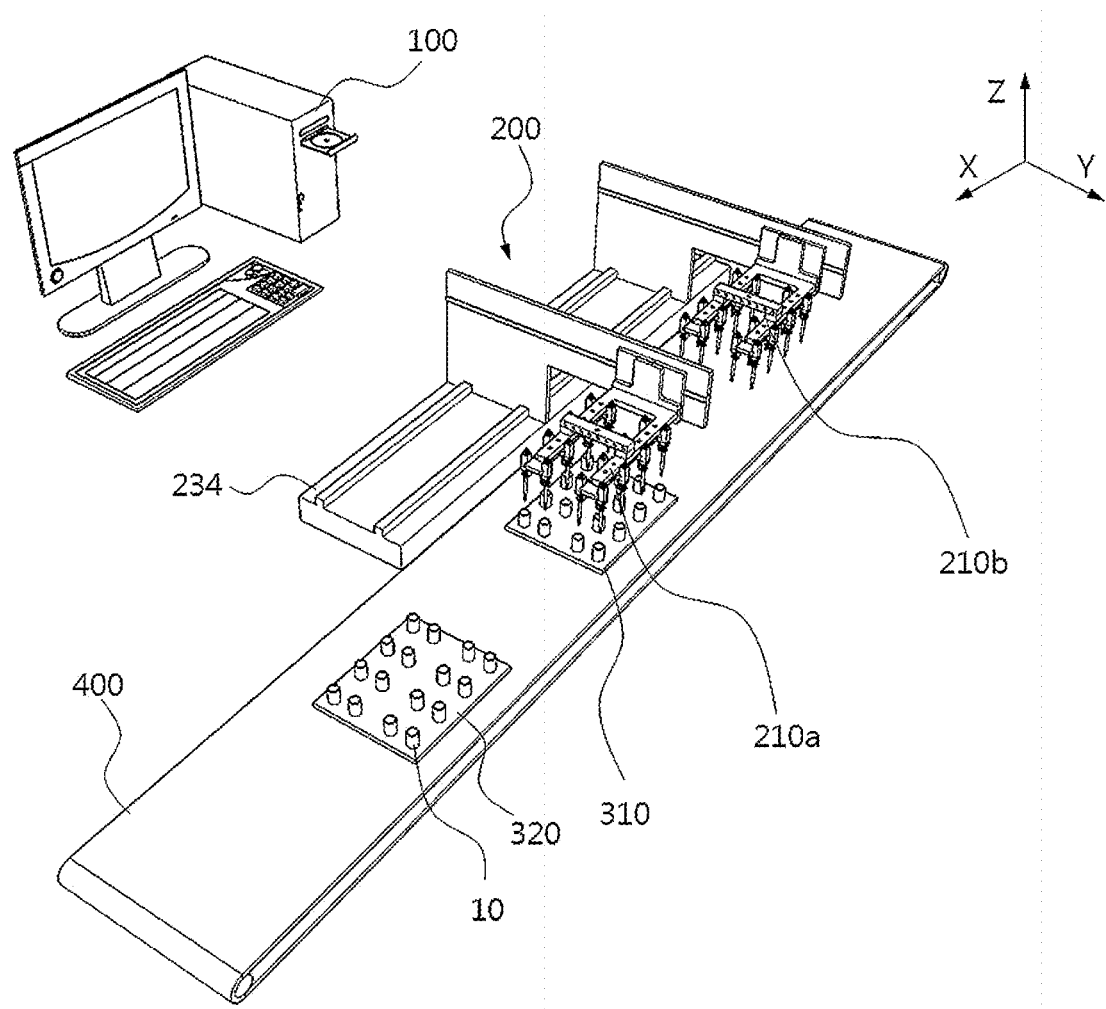

[FIG. 9]
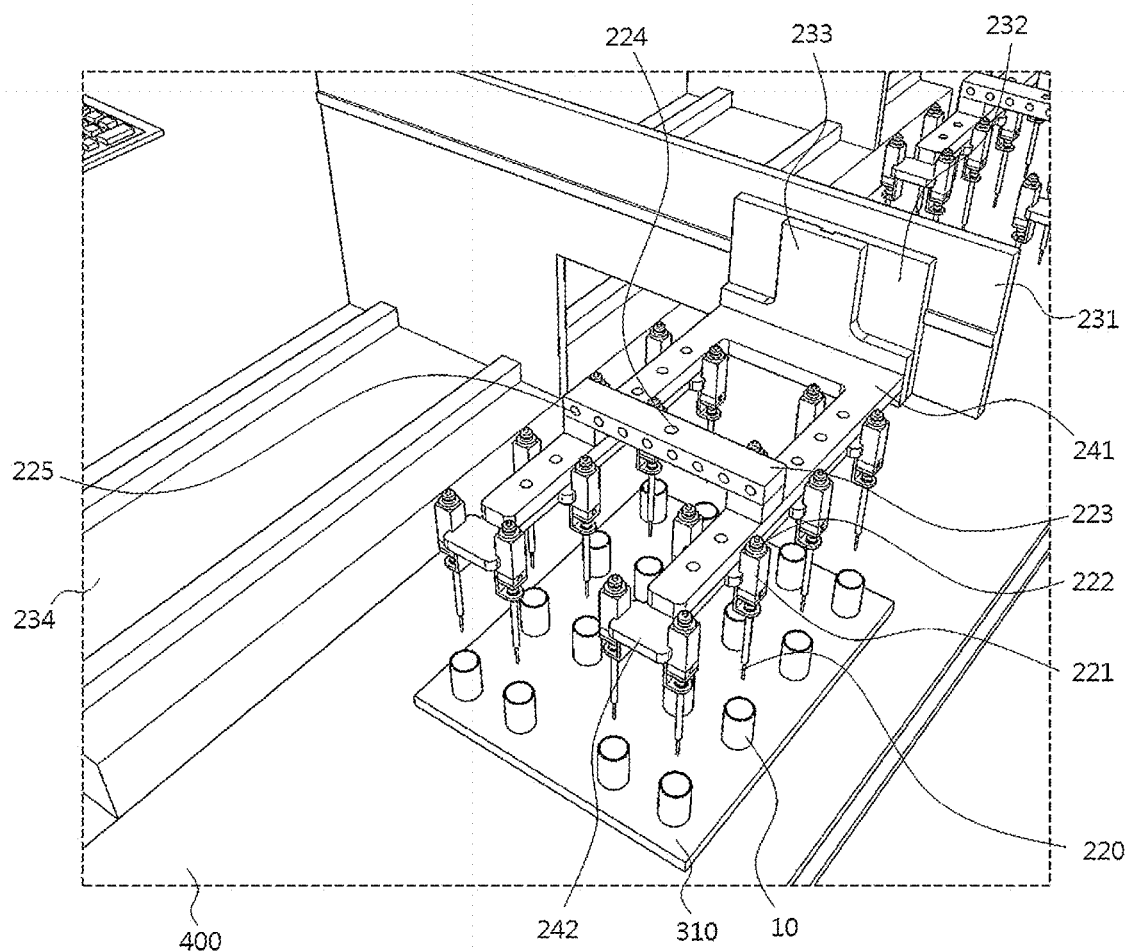

[FIG. 10]
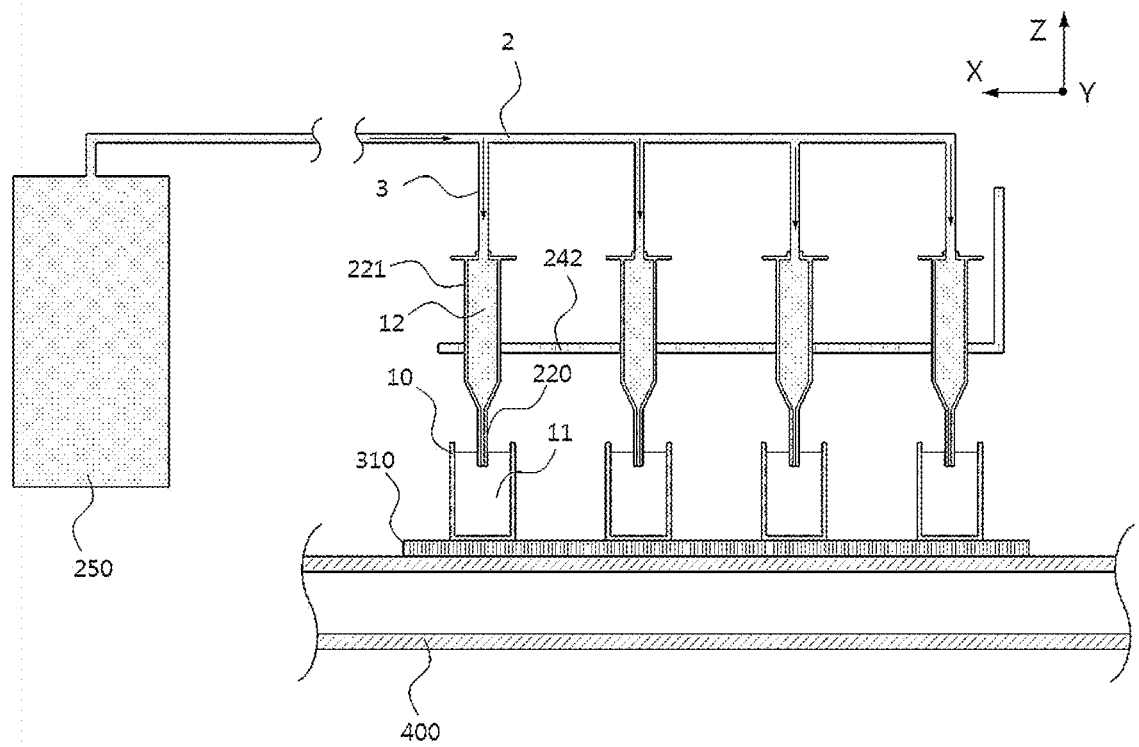

[FIG. 11]
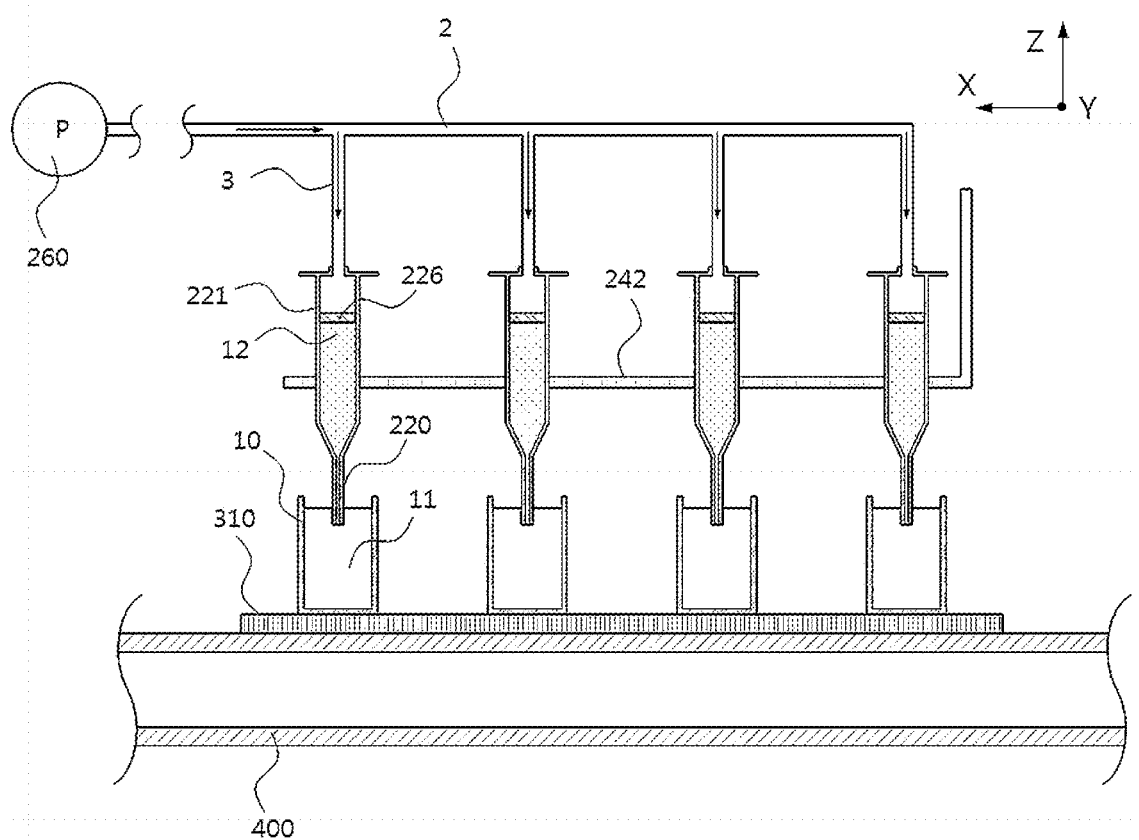

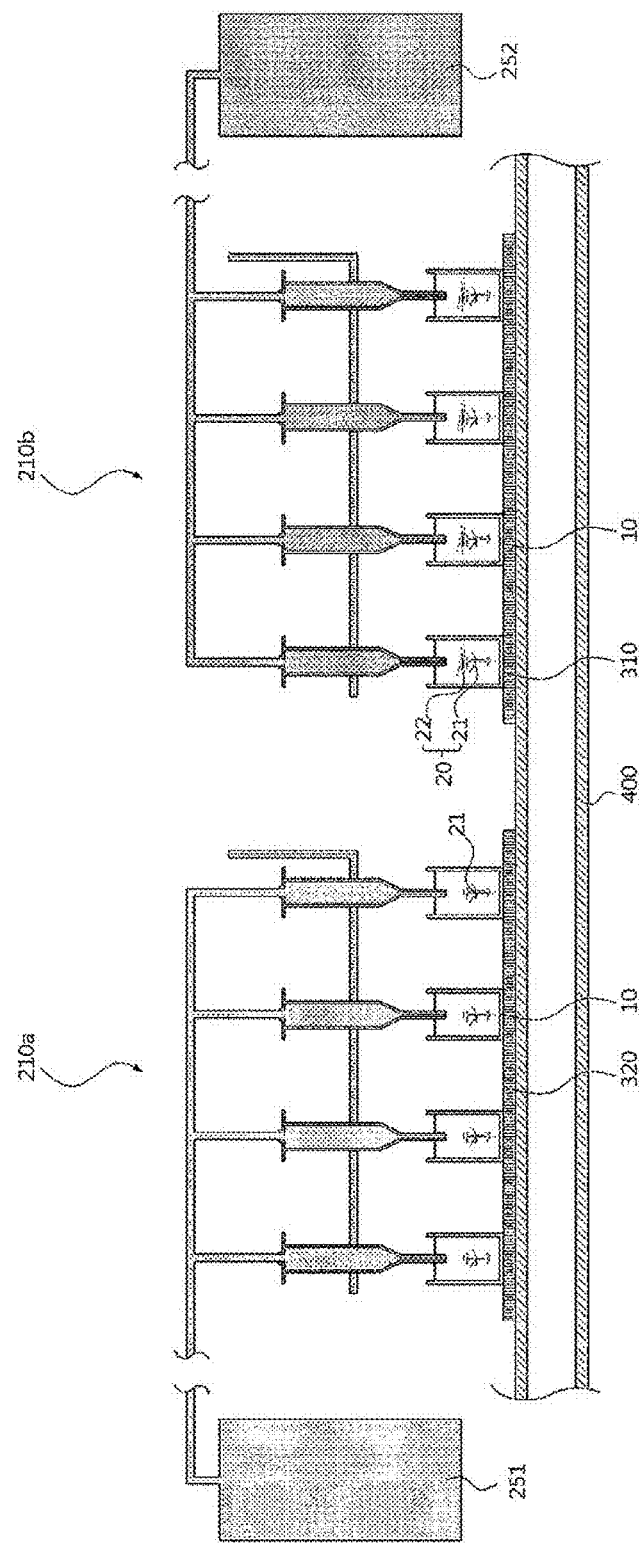
[FIG. 12]

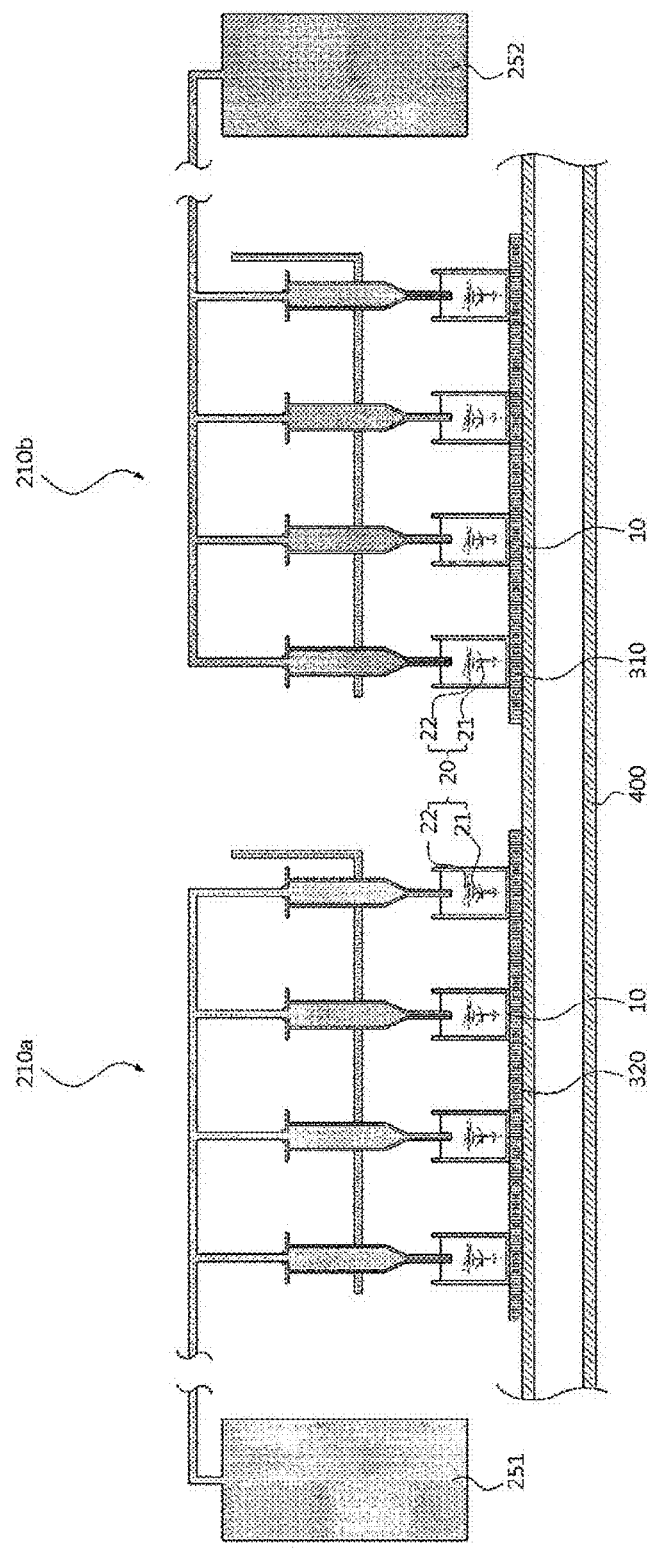
[FIG. 13]

[FIG. 14]
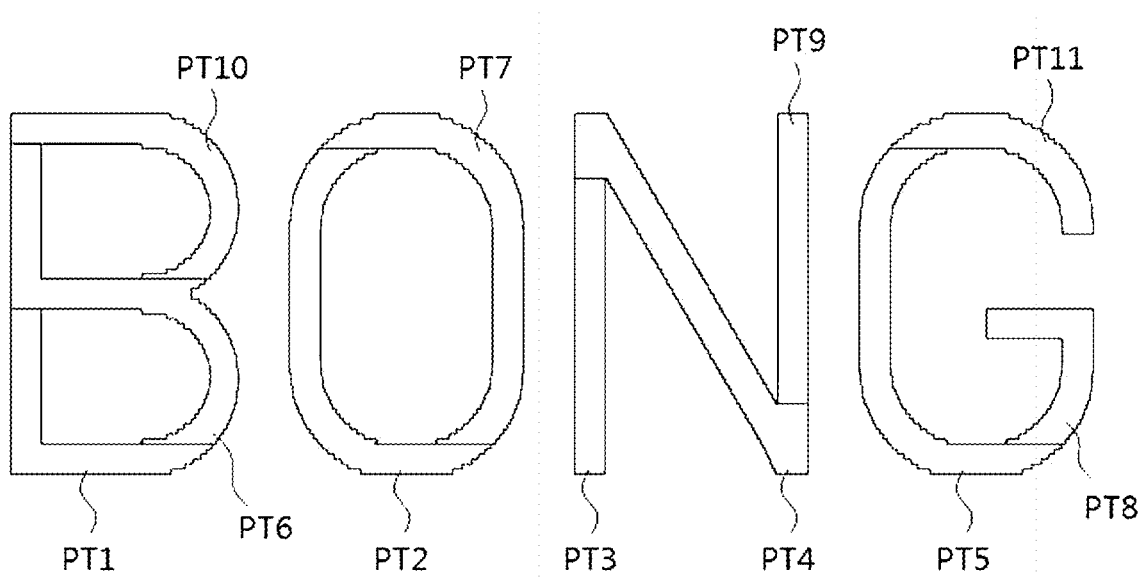

[FIG. 15]
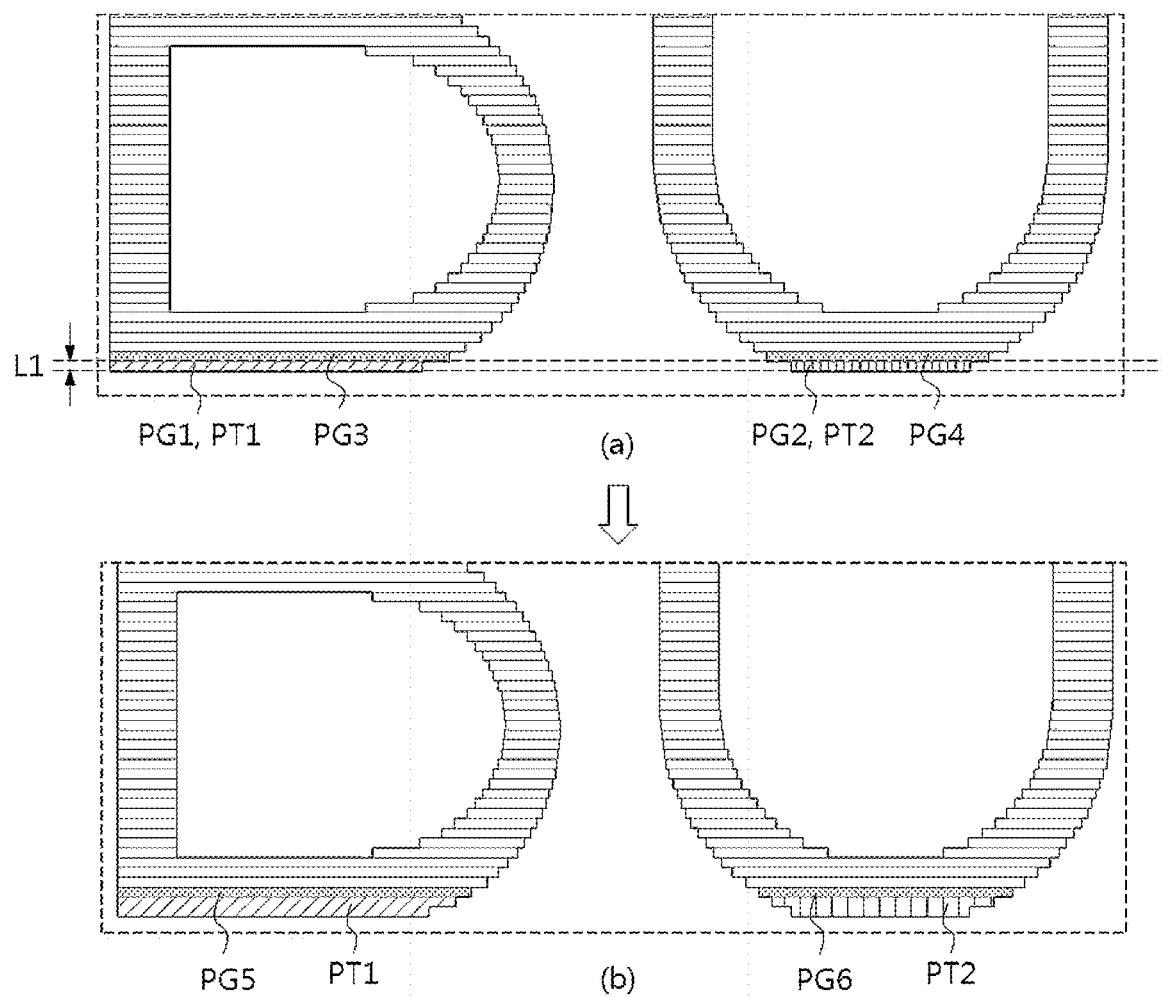

[FIG. 16]
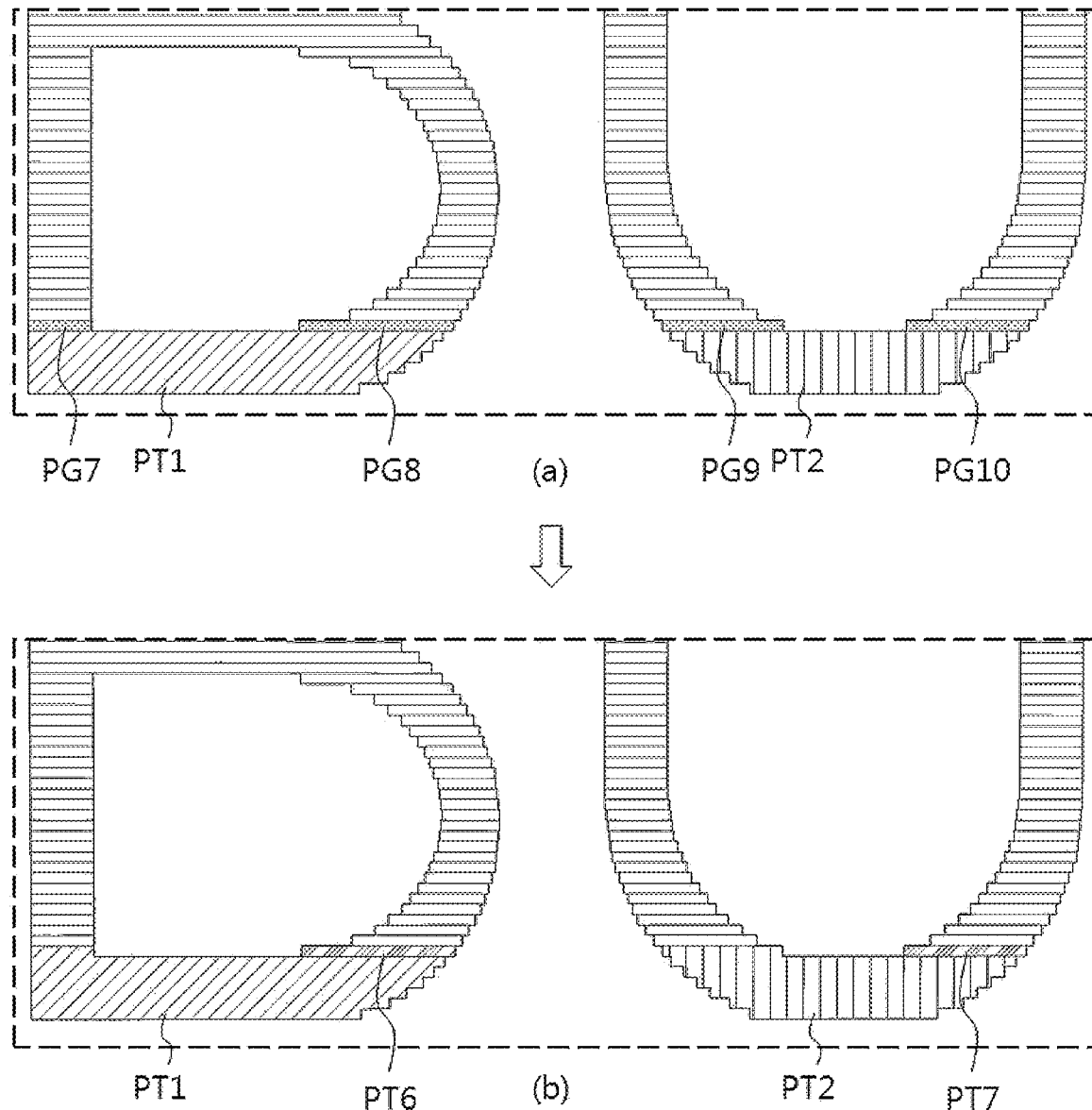

[FIG. 17]
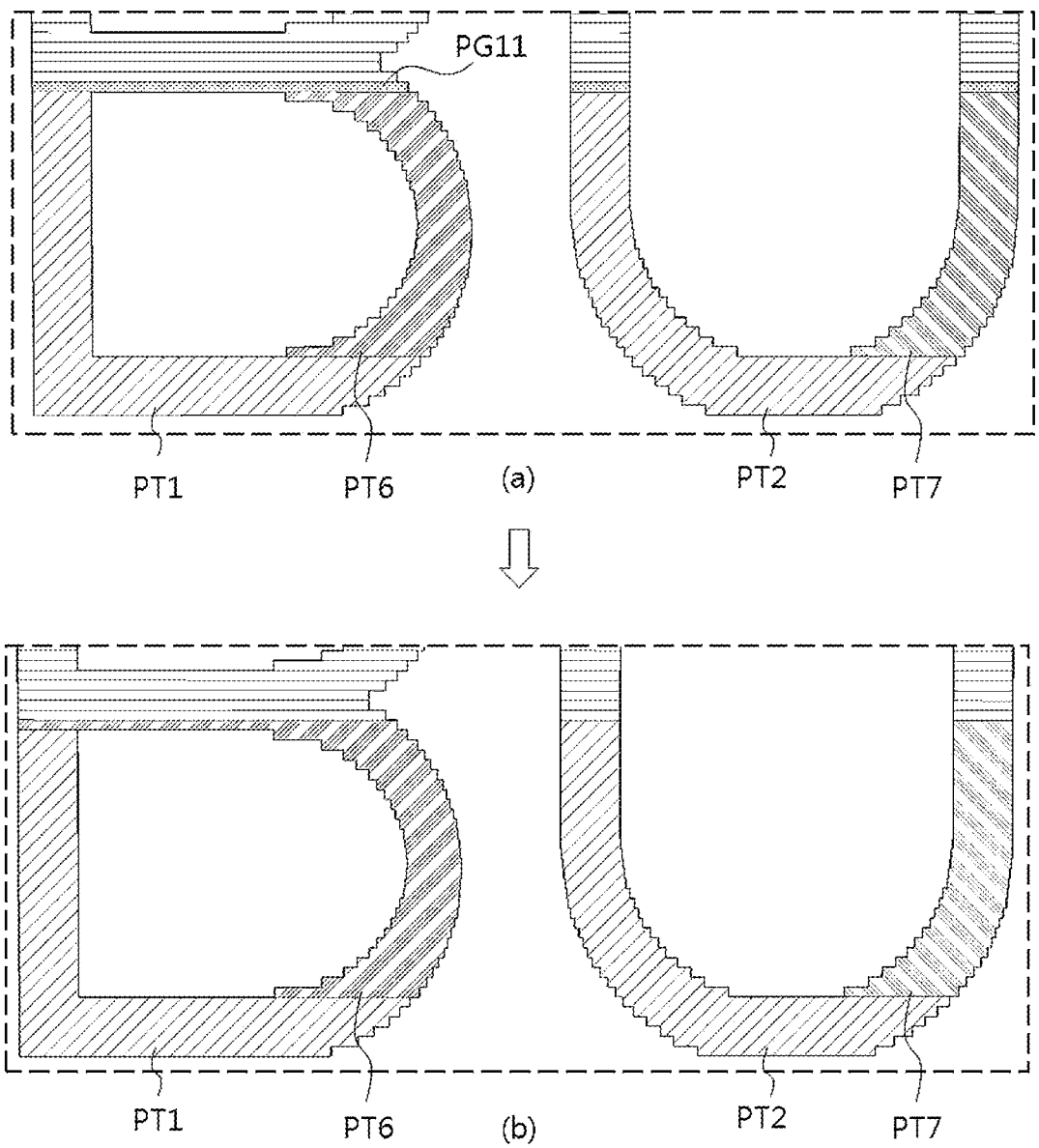

[FIG. 18]
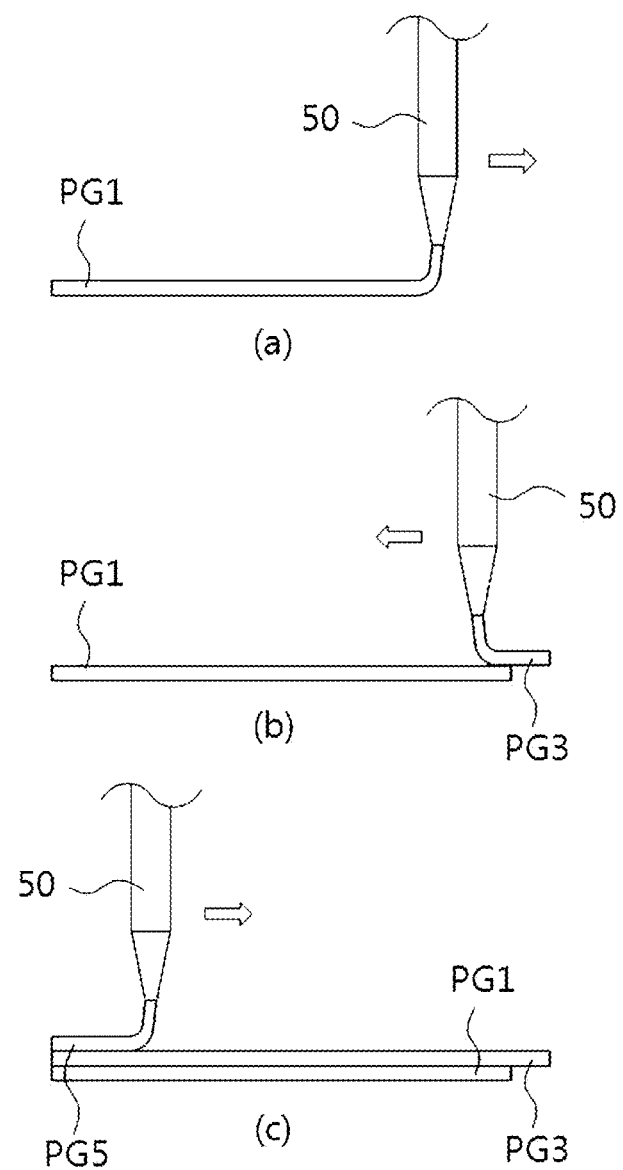

[FIG. 19]
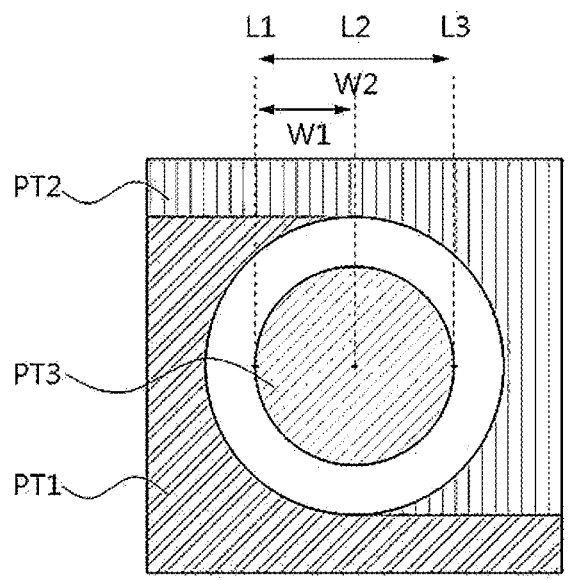
(a)
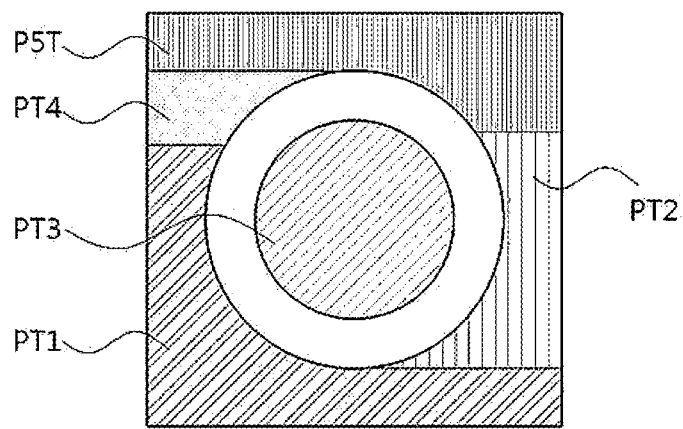
(b)

[FIG. 20]
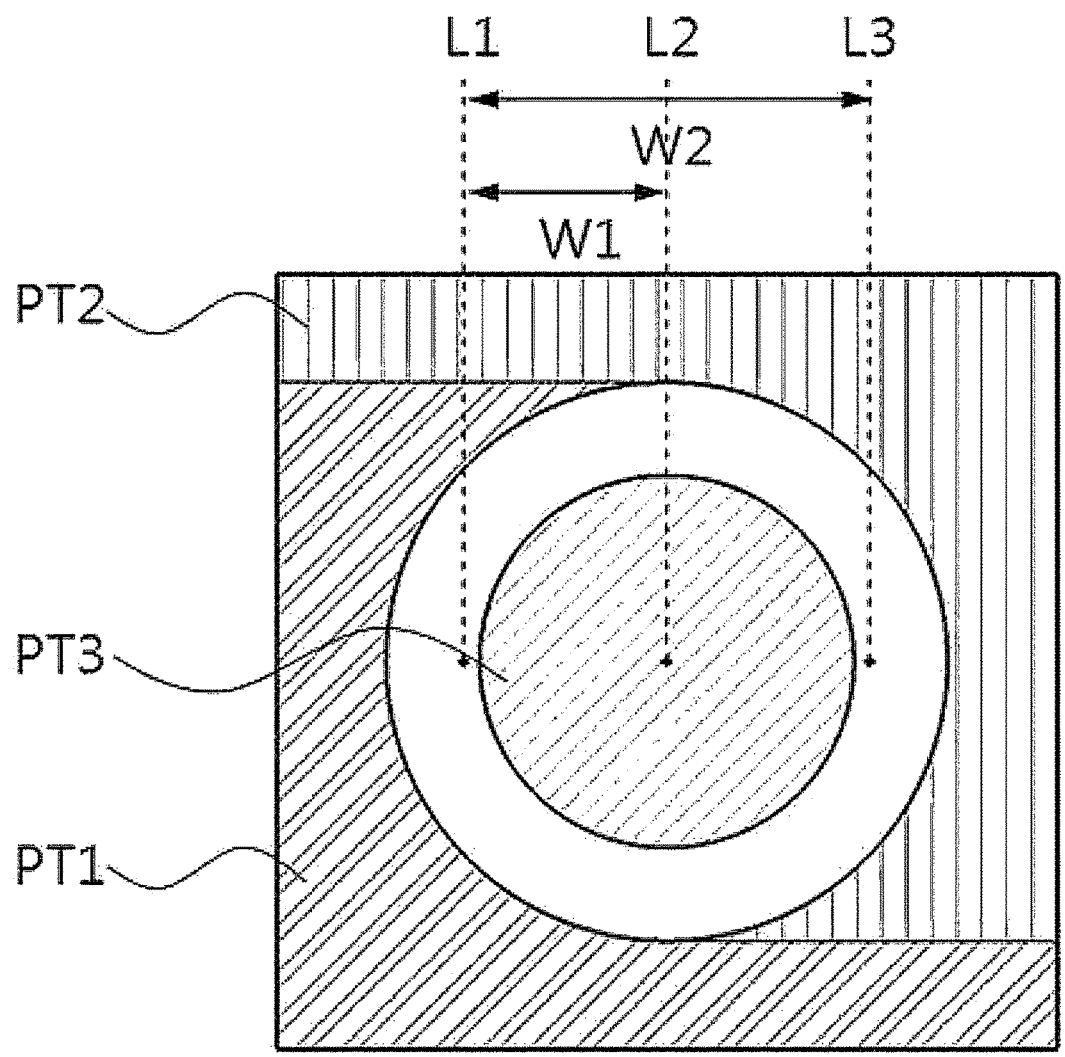

THREE-DIMENSIONAL LAYERING CONTROL SYSTEM, THREE-DIMENSIONAL LAYER MANUFACTURING METHOD, AND THREE-DIMENSIONAL LAYERED PRODUCT MANUFACTURED THEREBY

TECHNICAL FIELD

The present invention relates to a three-dimensional layering control system, a three-dimensional layer manufacturing method, and a three-dimensional layered product manufactured thereby.

BACKGROUND

Three-dimensional printing refers to a work for making electronic information (three-dimensional drawing) for implementing a three-dimensional shape three-dimensional through an automated output apparatus. An apparatus that performs such three-dimensional printing is called a three-dimensional printer.

A three-dimensional printing manner is largely divided into a cutting type manner and a layering type manner, but the three-dimensional printing generally refers to a layering type manner of layering materials. Korean Patent Laid-Open Publication No. 10-2016-0043872 (entitled "3D Printer", published on Apr. 22, 2016, and hereinafter referred to as Related Art 1) discloses a 3D printer that implements a three-dimensional shape in a layering type manner.

The conventional 3D printer as disclosed in the Related Art 1 has used a manner of forming one three-dimensional shape using a single nozzle. Since the single nozzle is used in such a manner, works such as a work for washing the nozzle and a work for exchanging layered materials inside the 3D printer should be first performed in order to form one three-dimensional shape using layered materials having different colors or components. Accordingly, there was a problem that it was somewhat difficult to apply such a manner to a mass production process for mass production of a specific product.

In addition, in the conventional art such as the Related Art 1, a three-dimensional shape to be layered is divided into a plurality of layers in a height direction, and the layers are sequentially formed from a lower side to an upper side. In the conventional art using the above manner, when targets to be layered on a layer having the same height are spaced apart from each other, the targets to be layered are formed while repeating spraying of the layered material and stopping of the spraying of the layered material, but in a process of stopping the spraying of the layered material and performing movement after spraying the layered material, the layered material sags due to a viscosity of the layered material, such that a line such as a stringing may occur between the layered targets. Such a stringing phenomenon may be a problem that deteriorates a quality of the three-dimensional shape.

Meanwhile, as an example of an industrial field using the 3D printing, a cosmetic field has attracted attention. A cosmetic market is a field that is growing in order to meet needs of various consumers, many technical developments have been made in the cosmetic market, and in particular, function improvement has been continued through the development of new cosmetic materials. However, in order to inform users of the improved function, a lot of money has been spent on marketing for cosmetics itself and a design of a cosmetic container. In such a situation, a marketing method that may intuitively promote an improved function of cosmetics is to form the cosmetics in a specific shape inside the cosmetic container.

As the conventional method of expressing a specific shape inside the cosmetic container, a method such as a method of forming a swirl shape by stirring different material, a method of forming a regular shape by spraying an opaque material into a transparent material while rotating the opaque material, or the like, have been used, but there is no method of implementing any desired three-dimensional shape.

RELATED ART DOCUMENT

Patent Document

Korean Patent Laid-Open Publication No. 10-2016-0043872 (entitled "3D Printer" and published on Apr. 22, 2016)

SUMMARY

Technical Problem

An object of the present invention is to provide a three-dimensional layering control system and a three-dimensional layer manufacturing method of forming a three-dimensional shape by spraying a layered material having a predetermined viscosity or more. Another object of the present invention is to provide a 3D model dividing and layering control system and method capable of minimizing a stringing phenomenon occurring in a process of repeating spraying of a layered material and stopping of the spraying of the layered material through a nozzle, improving a layering rate of a three-dimensional shape, forming a desired three-dimensional shape by layering a material having a viscosity different from that of a specific material inside the specific material, easily and simultaneously forming three-dimensional shapes inside each of a plurality of containers, and being suitable for a mass production process because separate washing of the nozzle and exchange of the layered material are not required.

Technical Solution

In one general aspect, a three-dimensional layering control system includes: an electronic device including a division unit receiving a information of a three-dimensional shape and dividing the three-dimensional shape into at least two or more partial models and a work information generation unit generating work information for each of the partial models; and at least two or more layer manufacturing apparatuses receiving the work information from the electronic device, individually allocated the partial models to be formed, and layering and forming the partial models, respectively, to layer and form one three-dimensional shape.

In addition, the at least two or more layer manufacturing apparatuses may be arranged side by side and sequentially form the individually allocated partial models to form the one three-dimensional shape.

In addition, the three-dimensional layering control system may further include: a stage having one surface on which the three-dimensional shape is formed; and a transfer unit transferring the stage to the respective layer manufacturing apparatuses according to a formation order of the partial models.

In addition, the layer manufacturing apparatus may insert a nozzle into a background material and spray a layered material from the nozzle to form a three-dimensional shape.

In addition, the division unit may divide the three-dimensional shape into the partial models on the basis of an insertion direction of the nozzle to be inserted in the layer manufacturing apparatus, and the electronic device may allocate a partial model positioned in the insertion direction of the nozzle among the divided partial models to a layer manufacturing apparatus first forming a partial model among the plurality of the layer manufacturing apparatuses.

In addition, at least one of the layer manufacturing apparatuses may spray a layered material different from that of another layer manufacturing apparatus.

In addition, at least one of the layer manufacturing apparatuses may spray a layered material having a color or a component different from that of another layer manufacturing apparatus.

In addition, the electronic device may further include a path optimization unit optimizing a path of the nozzle for each partial model divided by the division unit, and the work information for each of the partial models generated by the work information generation unit may include path information of the nozzle calculated by the path optimization unit.

In addition, the path optimization unit may divide each partial model divided by the division unit into a plurality of layers layered on one side, recognize a plurality of polygons included in each of the layers and spaced apart from each other, divide the plurality of polygons into a plurality of parts including polygons in contact with each other, and calculate the path information of the nozzle so that the nozzle sequentially form the plurality of parts.

In addition, the electronic device may further include a transmission unit transmitting the work information for each of the partial models generated by the work information generation unit in a wired manner or a wireless manner, and the layer manufacturing apparatus may include a reception unit receiving the work information transmitted by the transmission unit.

In addition, the three-dimensional layering control system may further include an external memory physically connectable to the electronic device or the layer manufacturing apparatus to store the work information for each of the partial models from the electronic device or to transfer the stored work information for each of the partial models to the layer manufacturing apparatus, wherein the electronic device and the layer manufacturing apparatus further include, respectively, connectors formed so that the external memory is connectable thereto.

In addition, the layer manufacturing apparatus may include a state information generation unit generating work state information or apparatus state information.

In addition, the state information generation unit may transmit the generated information to the electronic device, and the electronic device may further include a state information output unit receiving and outputting the work state information or the apparatus state information for each of the layer manufacturing apparatuses.

In another general aspect, a three-dimensional layering control system includes: an electronic device receiving information of a three-dimensional shape to be layered; a layer manufacturing apparatus receiving the information of the three-dimensional shape from the electronic device and forming the three-dimensional shape; a stage having one surface on which the three-dimensional shape is formed; and a transfer unit transferring the stage to the layer manufacturing apparatus, wherein the layer manufacturing apparatus includes: at least one or more head modules including a plurality of nozzles each spraying a layered material to form a three-dimensional shape; a moving unit moving the head modules; and a control unit controlling the head modules and the moving unit.

In addition, the number of head modules may be plural.

In addition, the head module may include: body portions provided in a number corresponding to the number of nozzles, each accommodating the layered material, and having one sides to which the nozzles are coupled; packing portions inserted into the body portions so as to be movable along the body portions, respectively, and pushing the layered material to the nozzles according to the movement; and a pressure source connected to each of a plurality of body portions through pressure lines and pushing the packing portions according to the supply of a pressure and allowing the nozzles to spray the layered material.

In addition, the head module may include: body portions provided in a number corresponding to the number of nozzles and having one sides to which the nozzles are coupled; and a pressure tank accommodating the layered material, connected to each of a plurality of body portions through pressure lines, and supplying the layered material to the body portions to allow the nozzles to spray the layered material.

In addition, the head module may further include a manifold connected to the pressure tank through a first pressure line to receive the layered material from the pressure tank, and connected to each of the plurality of body portions in parallel through second pressure lines to distribute the received layered material to the body portions.

In addition, all of lengths of the second pressure lines may be the same as each other.

In addition, valves controlling whether or not to supply the layered material supplied to the body portions through the second pressure lines may be provided in the manifold so as to correspond to the respective second pressure lines.

In addition, the numbers and of nozzles and positions of the nozzles included in all the head modules may be the same as each other.

In addition, the plurality of head modules may be arranged side by side, and the transfer unit moves the stage so that the stage passes through the head modules arranged side by side.

In addition, the moving unit may move the head module in three-axis directions orthogonal to each other.

In addition, the moving unit may include an X-axis moving member, a Y-axis moving member, a Z-axis moving member, and an X-axis rail that move the head module in three directions orthogonal to each other, and the X-axis moving member of the head module may be coupled to one X-axis rail formed in the same direction as a direction in which the transfer unit transfers the stage.

In addition, the electronic device may include: a division unit receiving the information of the three-dimensional shape and dividing the three-dimensional shape into at least one or more partial models; a work information generation unit generating work information for each of the partial models; and a transmission unit transmitting the work information for each of the partial models generated by the work information generation unit to the layer manufacturing apparatus.

In addition, the number of head modules may be plural, and the control unit may allocate the received work information for each of the partial models to each of the head modules, and the head module may form the allocated partial models, respectively, such that the plurality of head modules layer and form one three-dimensional shape.

In addition, a container in which a background material is accommodated may be disposed on one surface of the stage, and the nozzle may be inserted into the container and then spray a layered material to form a three-dimensional shape.

In addition, the division unit may divide the three-dimensional shape into the partial models on the basis of an insertion direction of the nozzle, and the control unit may allocate a partial model positioned in the insertion direction of the nozzle among the divided partial models to a head module first forming a partial model among the plurality of head modules.

In addition, the electronic device may further include a path optimization unit optimizing a path of the nozzle for each partial model divided by the division unit, and the work information for each of the partial models generated by the work information generation unit may include path information of the nozzle calculated by the path optimization unit.

In addition, the path optimization unit may divide each partial model divided by the division unit into a plurality of layers layered on one side, recognize a plurality of polygons included in each of the layers and spaced apart from each other, divide the plurality of polygons into a plurality of parts including polygons in contact with each other, and calculate the path information of the nozzle so that the nozzle sequentially form the plurality of parts.

In addition, the electronic device may further include a transmission unit transmitting the work information for each of the partial models generated by the work information generation unit in a wired manner or a wireless manner, and the layer manufacturing apparatus may further include a reception unit receiving the work information transmitted by the transmission unit.

In addition, the layer manufacturing apparatus may further include a state information generation unit generating work state information or apparatus state information.

In addition, the state information generation unit may transmit the generated information to the electronic device, and the electronic device may further include a state information output unit receiving and outputting the work state information or the apparatus state information for each of the layer manufacturing apparatuses.

In addition, at least one of the head modules may spray a layered material different from that of another head module.

In addition, at least one of the head modules may spray a layered material having a color or a component different from that of another head module.

A product including: a container; a background material filled in the container; and a three-dimensional shape surrounded by the background material, including at least one or more different partial models, and formed by sequentially forming the partial models by at least one or more head modules included in a layer manufacturing apparatus may be manufactured through the layering control method according to the present invention.

In another general aspect, a three-dimensional layering control method includes: a30) a step of receiving information of a three-dimensional shape to be layered; b30) a step of dividing the three-dimensional shape into a plurality of layers layered on one side; c30) a step of recognizing a plurality of polygons included in each of the layers and spaced apart from each other; d30) a step of dividing the three-dimensional shape into parts including the polygons in contact with each other in a layered direction; and e30) a step of forming the three-dimensional shape by spraying a layered material having a predetermined viscosity or more using a nozzle to sequentially form the parts divided in the step d30).

In addition, the step d30) may include: d31) a step of generating a part list; and d32) a step of selecting the polygons recognized in step c30), selecting parts included in the part list while performing postorder traversal from a part formed later, incorporating the selected polygon into a corresponding part in a case where the selected polygon and the uppermost polygon of the selected part are in contact with each other, and classifying the selected polygon into a separate part and including the separate part into the part list in a case where the selected polygon is not in contact with the uppermost polygon of each of all the parts.

In addition, in the step d32), the selected polygons may be classified into parts while sequentially selecting polygons from polygons included in a layer positioned on a lower side to polygons included in a layer positioned on an upper side.

In addition, in the step e30), the nozzle may be inserted into a background material having a predetermined viscosity and then spray the layered material to sequentially form the parts.

In addition, the background material may have a transparency of a predetermined level or more.

In addition, the layered material and the background material may have different viscosities.

In addition, the layered material may have a color different from that of the background material.

In addition, in the step e30), the parts may be sequentially formed from a part positioned at an end of a first direction in which the nozzle is inserted to a part positioned at an end in an opposite direction to the first direction.

In addition, the step d30) may further include d33) a step performed after the step d32) and of comparing regions of the respective parts divided in the step d32) with each other, and separating an overlapping region of a first part into a third part separate from the first part, and designating an order number again so that the third part is formed later than a second part in a case where a region of the first part overlaps a region of the second part formed later than the first part and the overlapping region of the first part is positioned in the opposite direction to the first direction with respect to the overlapping region of the second part.

In addition, in the step d33), in a case where the region of the first part overlaps a region obtained by adding a diameter of the nozzle to the region of the second part and the overlapping region of the first part is positioned in the opposite direction to the first direction with respect to the region obtained by adding the diameter of the nozzle to the region of the second part, the overlapping region of the first part may be separated into the third part separate from the first part and the order number may be designated so that the third part is formed later than the second part.

In addition, in the step e30), when the formation of one part ends, the nozzle may stop spraying the layered material, be moved so that a spraying end is positioned at one end of a first forming target layer of the next part to be formed, and form the next part.

In addition, the step d30) may further include d34) a step performed before the step e30) and of storing work information determined before the step e30) and transferring the work information to a layer manufacturing apparatus to allow the three-dimensional shape to be formed in the step e30).

The three-dimensional layering control method according to the present invention may manufacture a product including: a container; a background material filled in the container; and a three-dimensional shape having a viscosity different from that of the background material, surrounded by the background material, and formed using the three-dimensional layering control method.

The product may be a cosmetic product in which the background material of the product is a first cosmetic composition having a predetermined viscosity, and the three-dimensional shape is a second cosmetic composition having a different viscosity from that of the background material.

In addition, the product may be a food and beverage product in which the background material of the product is a first food and beverage composition having a predetermined viscosity, and the three-dimensional shape is a second food and beverage composition having a different viscosity from that of the background material.

In addition, the product may be a pharmaceutical product in which the background material of the product is a first pharmaceutical composition having a predetermined viscosity, and the three-dimensional shape is a second pharmaceutical composition having a different viscosity from that of the background material.

In addition, the product may be a bio-product in which the background material of the product is a first bio-composition having a predetermined viscosity, and the three-dimensional shape is a second bio-composition having a different viscosity from that of the background material.

Advantageous Effects

As set forth above, the three-dimensional layering control system and the three-dimensional layering control method according to the present invention, the three-dimensional shape is divided into at least two or more partial models by the division unit, and the divided partial models are individually allocated to different layer manufacturing apparatuses to allow the different layer manufacturing apparatuses to form one three-dimensional shape together, thereby making it possible to more quickly form a three-dimensional shape having various colors and made of different layered materials without washing the nozzle and exchanging the layered materials.

In addition, according to the present invention, the layer manufacturing apparatus includes at least one or more head modules each including a plurality of nozzles, and the plurality of nozzles included in the head modules individually form a three-dimensional shape, and thus, the three-dimensional layering control system and the three-dimensional layering control method according to the present invention are suitable for mass production.

In addition, according to the present invention, in a case where the number of head modules is at least two or more, the division unit divides the three-dimensional shape into partial models so as to correspond to the number of head modules, and work information for the divided partial models are allocated to the respective head modules, thereby making it possible to allow the respective head module to form one three-dimensional shape together. Therefore, it is possible to more quickly form a three-dimensional shape having various colors and made of different layered materials without washing the nozzle and exchanging the layered materials, and thus, the three-dimensional layering control system and the three-dimensional layering control method according to the present invention are suitable for mass production.

In addition, according to the present invention, the three-dimensional shape is not formed sequentially for each layer, but a specific part including connected polygons is formed first, and the next part is then formed, and thus, a movement distance of the nozzle is relatively shortened, such that an output time is decreased.

In addition, according to the present invention, since polygons included in one part are formed in one stroke drawing in step e30), a movement distance of the nozzle is relatively shortened, such that an output time is further decreased, and when the polygons included in the part are formed by spraying a layered material having a viscosity, the number of times of spraying of the layered material and stopping of the spraying of the layered material is decreased, such that the occurrence of a stringing phenomenon may be minimized.

BRIEF DESCRIPTION OF THE DRAWINGS

FIG. 1 is a block diagram of a three-dimensional layering control system according to a first embodiment of the present invention.

FIG. 2 is a view illustrating an example of a three-dimensional shape formed in the three-dimensional layering control system according to the first embodiment of the present invention.

FIG. 3 is a schematic view illustrating that the three-dimensional shape illustrated in FIG. 2 is divided into partial models by a division unit of the three-dimensional layering control system according to the first embodiment of the present invention.

FIG. 4 is a schematic view illustrating that one model is divided into a plurality of parts by a path optimization unit of the three-dimensional layering control system according to the first embodiment of the present invention.

FIG. 5 is an installation perspective view of the three-dimensional layering control system according to the first embodiment of the present invention.

FIG. 6 is a front view of a product manufactured using the three-dimensional layering control system according to the first embodiment of the present invention.

FIG. 7 is a view illustrating an example of a screen output by a work state output unit of the three-dimensional layering control system according to the first embodiment of the present invention.

FIG. 8 is a perspective view of a three-dimensional layering control system according to a second embodiment of the present invention.

FIG. 9 is a partially enlarged view of FIG. 8.

FIGS. 10 and 11 are front schematic views of a head module, a stage, and a transfer unit of the three-dimensional layering control system according to the second embodiment of the present invention.

FIGS. 12 and 13 are schematic views of a first operation embodiment and a second operation embodiment of the three-dimensional layering control system according to the second embodiment of the present invention, respectively.

FIG. 14 is a schematic view illustrating that a three-dimensional shape is divided into a plurality of parts in a three-dimensional layer manufacturing method according to a third embodiment of the present invention.

FIGS. 15 to 17 are schematic views of a process in which step d32) is performed in the three-dimensional layer manufacturing method according to the third embodiment of the present invention.

FIG. 18 is a schematic view of a process in which step e30) is performed in the three-dimensional layer manufacturing method according to the third embodiment of the present invention.

FIGS. 19 and 20 are schematic views of a process in which step d33) is performed in the three-dimensional layer manufacturing method according to the third embodiment of the present invention.

DETAILED DESCRIPTION OF EMBODIMENTS

Hereinafter, a preferred embodiment of a three-dimensional layering control system according to the present invention will be described in detail with reference to the accompanying drawings.

First Embodiment—Three-Dimensional Layering Control System

FIG. 1 schematically illustrates a three-dimensional layering control system according to a first embodiment of the present invention.

As illustrated in FIG. 1, the three-dimensional layering control system according to the first embodiment of the present invention may include an electronic device 100 and a layer manufacturing apparatus 200.

The electronic device 100 may play a role of controlling and monitoring for transferring work information to a layer manufacturing apparatus 200 to be described later to control a process of forming a three-dimensional shape and receiving a work state from the layer manufacturing apparatus 200 and outputting a state. The electronic device 100 may include a division unit, a work information generation unit, a path optimization unit, a transmission unit, and a work state output unit as illustrated in FIG. 1 for the above-described operation. The division unit, the work information generation unit, the path optimization unit, the transmission unit, and the work state output unit may be implemented as hardware or software installed inside the electronic device.

The layer manufacturing apparatus 200 is an output apparatus that receives the work information from the electronic device 100 and actually outputs a three-dimensional shape, and as illustrated in FIG. 1, in the present embodiment, the number of layer manufacturing apparatuses 200 may be plural. The individual layer manufacturing apparatus 200 may include a control unit, a nozzle, and a state information generation unit.

Hereinafter, detailed components included in the electronic device 100 and the layer manufacturing apparatus 200 will be described in detail with reference to the drawings.

The division unit receives information of a three-dimensional shape to be formed and divides the three-dimensional shape into at least two partial models. A subject that inputs the information of the three-dimensional shape may be a user 1 as illustrated in FIG. 1, but the present invention does not limit the subject that inputs the information of the three-dimensional shape to the user 1, and an automated device may input the information of the three-dimensional shape.

FIG. 2 illustrates a three-dimensional shape received in the three-dimensional layering control system according to the first embodiment of the present invention and partial models obtained by dividing the three-dimensional shape by the division unit.

A three-dimensional shape 10 illustrated in FIG. 2A is a flower shape, and the three-dimensional shape 10 illustrated in FIG. 2A may be divided into a first partial model 11 and a second partial model 12 by the division unit, as illustrated in FIG. 2B. A criterion for dividing the three-dimensional shape 10 illustrated in FIG. 2 into the first partial model 11 and the second partial model 12 may be a type of a layered material forming each partial model. To this end, the information of the three-dimensional shape input to the electronic device 100 may include information on a type of a layered material forming a specific portion of the three-dimensional shape.

Referring to FIG. 2B, the first partial model 11 and the second partial model 12 may be formed of different types of materials for the purpose of a product including the three-dimensional shape 10. For example, A of different functional materials A and B may form the first partial model 11, and B of the different functional materials A and B may form the second partial model 12. Colors of the materials forming the first partial model 11 and the second partial model 12 may be different from each other. For example, in order to more specifically express the three-dimensional shape 10 having a flower shape illustrated in FIG. 2, the first partial model 11 may be formed in green to express stems and leaves of a flower, and the second partial model 12 may be formed in red or blue to express petals.

The first partial model 11 and the second partial model 12 divided by the division unit may be allocated to and divided and formed by the layer manufacturing apparatuses 200, respectively. That is, one layer manufacturing apparatus 200 forms the first partial model 11, and another layer manufacturing apparatus 200 forms the second partial model 12 on the first partial model 11, such that the plurality of layer manufacturing apparatuses 200 may form one three-dimensional shape 10. Since the first partial model 11 and the second partial model 12 are sequentially formed as described above, when the second partial model 12 is formed using the nozzle, the first partial model 11 that has been already formed should not be damaged by the nozzle, and accordingly, the division unit should divide the input three-dimensional shape by grasping a temporal relationship in which the partial models are formed. More specifically, in a case where it is assumed that the nozzle is inserted from an upper side to a lower side to form the partial models in FIG. 2, even though a partial region of the first partial model 11 formed first and a partial region of the second partial model 12 overlap each other, the division unit should divide the three-dimensional shape 10 so that the overlapping partial region of the first partial model 11 is not positioned above the overlapping partial region of the second partial model 12.

The path optimization unit optimizes a path of the nozzle for each partial model divided by the division unit.

FIG. 3 illustrates that each of the first partial model 11 and the second partial model 12 divided by the division unit is divided in a layering direction and divided into a plurality of layers layered on one side. The path optimization unit divides each partial model divided by the division unit as described above into the plurality of layers layered on one side, and recognizes a plurality of polygons included in each layer and spaced apart from each other. Thereafter, the path optimization unit may divide the recognized polygons into a plurality of parts including polygons in contact with each other, and calculate path information of the nozzle on whether or not the nozzle may form the corresponding part by the shortest distance when through which path the nozzle moves for each part.

FIG. 4 illustrates a front surface of one model of an alphabet B shape in order to describe an example of the operation of the path optimization unit described above.

As illustrated in FIG. 4, the model of the alphabet B shape is divided into a first part PT1, a second part PT2, and a third part PT3, each part includes polygons in contact with each other among polygons included for each layer, and the path optimization unit calculates the path information of the nozzle for each part.

More specifically, the path optimization unit may calculate path information of the nozzle so as to sequentially form polygons included in the first part PT1. Describing this on the basis of the first part PT1, the nozzle may form a polygon positioned at the lowermost portion by in one stroke drawing method, move to an upper layer, and then form a polygon of the next layer again by in one stroke drawing method to form the first part PT1. The nozzle may continuously spray a layered material or stop spraying the layered material depending on shapes of the polygons that are continuously formed, but the number of times of repetition of spraying of the layered material and stopping of the spraying of the layered material and a movement distance of the nozzle are decreased as compared with the conventional method of forming a plurality of layers while moving the nozzle only to one side, such that the three-dimensional shape may be more quickly formed. In addition, in the present embodiment, through the operation of the path optimization unit as described above, in a case where the layered material forming the three-dimensional shape 10 has a predetermined viscosity or more, a stringing phenomenon occurring in a process of repeating the supply of the layered material and the stop of the supply of the layered material may be decreased, such that a quality of the three-dimensional shape manufactured in the present embodiment may be improved.

The work information generating unit generates work information for each partial model including information of the partial models divided by the division unit and the path information of the nozzle for each partial model calculated by the path optimization unit. The work information for each partial model generated by the work information generation unit may be stored in a file having a predetermined name and allocated to separate layer manufacturing apparatuses 200. Since the first partial model 11 of the partial models divided in the division unit should be formed first, the information of the first partial model 11 may be allocated to a layer manufacturing apparatus positioned ahead among the layer manufacturing apparatuses arranged side by side, and since the second partial model 12 of the partial models divided in the division unit is formed after the first partial model 11, the information of the second partial model 12 may be allocated to a layer manufacturing apparatus positioned behind among the layer manufacturing apparatuses arranged side by side. The meaning of the layer manufacturing apparatus positioned ahead is that the partial model is formed first.

The transmission unit may transmit the work information for each partial model generated by the work information generation unit to individual layer manufacturing apparatuses in a wired manner or a wireless manner or may transmit the work information for each partial model to the individual layer manufacturing apparatuses using a removable memory such as a universal serial bus (USB). In a case where the transmission unit transmits the work information for each partial model in the wired manner or the wireless manner, each layer manufacturing apparatus may further include a reception unit capable of receiving the work information for each partial model. In a case where a manner of transmitting the generated work information for each partial model to the layer manufacturing apparatus through the removable memory is used in the transmission unit, the electronic device 100 may include a separate connector capable of coupling the removable memory thereto, and when the removable memory is physically coupled to the electronic device 100, the work information for each partial model generated by the work information generating unit may be manually or automatically stored in the removable memory. The work information for each partial model stored in the removable memory may include an identification code capable of identifying the layer manufacturing apparatus that the work information is to be allocated.

The layer manufacturing apparatus 200 may also include a connector that may be physically coupled to the removable memory, similar to the electronic device 100, and when the removable memory is coupled to the layer manufacturing apparatus, one of the work information for each partial model included in the removable memory may be manually or automatically transmitted to the layer manufacturing apparatus.

FIG. 5 illustrates an electronic device 100 and layer manufacturing apparatuses arranged side by side.

As illustrated in FIG. 5, the three-dimensional layering control system according to the first embodiment of the present invention may include a single electronic device 100, a first layer manufacturing apparatus 201, and a second layer manufacturing apparatus 202, and may further include a first stage 310, a second stage 320, and a transfer unit 400.

As illustrated in FIG. 5, the first layer manufacturing apparatus 201 and the second layer manufacturing apparatus 202 are arranged side by side to sequentially form the first partial model 11 and the second partial model 12 described above. The first stage 310 and the second stage 320 are a kind of worktables having upper surfaces on which individual three-dimensional shapes are formed, and may be spaced apart from each other, placed on the transfer unit 400, and moved to one side according to an operation of the transfer unit 400. A separate container (not illustrated) may be placed on the first stage 310, and a background material may be accommodated in the container. The background material may be different from the layered material sprayed from the first layer manufacturing apparatus 201 and the second layer manufacturing apparatus 202, and may have a transparency of a predetermined level or more. The three-dimensional layering control system according to the first embodiment of the present invention may further include a background material injection unit injecting the background material into the container.

In the present embodiment illustrated in FIG. 5, the first layer manufacturing apparatus 201 and the second layer manufacturing apparatus 202 are separate apparatuses, and are individually controlled by control units included in the first layer manufacturing apparatus 201 and the second layer manufacturing apparatus 202, but the present invention is not limited thereto, and there may also be an embodiment in which the first layer manufacturing apparatus 201 and the second layer manufacturing apparatus 202 are a kind of work units including separate nozzles and one control unit controls the first layer manufacturing apparatus 201 and the second layer manufacturing apparatus 202 together.

The first layer manufacturing apparatus 201 may insert a nozzle into the container of the first stage 310 positioned at a lower portion thereof, and then form the first partial model 11, which is allocated to the first layer manufacturing apparatus 201, of the partial models divided from the three-dimensional shape. Thereafter, the transfer unit 400 may move the first stage 310 to the second layer manufacturing apparatus 202 positioned next to the first layer manufacturing apparatus 201, and the second layer manufacturing apparatus 202 may insert a nozzle into the container in which the first partial model 11 is formed, and then forming the second partial model 12 to form one three-dimensional shape. When the first stage 310 is moved to the right by the transfer unit 400, the second stage 320 may be placed in the first layer manufacturing apparatus 201, and the first layer manufacturing apparatus 201 may insert the nozzle into a container placed on the second stage 320, and then form the first partial model 11 again. That is, in the present embodiment, one three-dimensional shape is formed together using the electronic device 100 and the plurality of layer manufacturing apparatuses.

In the present embodiment illustrated in FIG. 5, layered materials individually accommodated in and sprayed from the first layer manufacturing apparatus 201 and the second layer manufacturing apparatus 202 may be different from each other. The layered materials may vary depending on information of the partial model to be formed in each of the first layer manufacturing apparatus 201 and the second layer manufacturing apparatus 202, and since the three-dimensional shape formed of the different layered materials may be formed without separately washing the nozzles through the first layer manufacturing apparatus 201 and the second layer manufacturing apparatus 202 that forms one three-dimensional shape together using the different layered materials, the present embodiment has an effect of improving a speed of forming the three-dimensional shape.

FIG. 6 schematically illustrates a product formed using the three-dimensional layering control system according to the first embodiment of the present invention described above.

The product illustrated in FIG. 6 may be a product in which two different liquids (a layered material and a background material forming the three-dimensional shape) are mixed with each other and used at the time of being used, but maintains their shapes before being mixed with each other. Representative examples of the product illustrated in FIG. 6 may be a cosmetic product, a food and beverage product, a pharmaceutical product, and a bio-related product. When the product is the cosmetic product, the background material may be a first cosmetic composition, and the layered material may be a second cosmetic composition, when the product is the food and beverage product, the background material may be a first food and beverage composition and the layered material may be a second food and beverage composition, when the product is the pharmaceutical product, the background material may be a first pharmaceutical composition, and the layered material may be a second pharmaceutical composition, and when the product is the bio-related product, the background material may be a first bio-composition, and the layered material may be a second bio-composition.

As illustrated in FIG. 6, the three-dimensional layering control system according to the first embodiment of the present invention may be performed inside a container 20 filled with a background material 30 to form a three-dimensional shape 10. The container 20 may include a lid 21 and an inlet 22 of the container 20 coupled to the lid 21, and the nozzle described above may be inserted into the background material 30 through the inlet 22, and then form the three-dimensional shape 10 illustrated in FIG. 3 inside the container 20 through the first layer manufacturing apparatus 201 and the second layer manufacturing apparatus 202.

The three-dimensional shape 10 illustrated in FIG. 6 is divided into at least two or more partial models as described above, and is then formed by individually forming the partial models through the individual layer manufacturing apparatuses.

The state information generation unit of the layer manufacturing apparatus 200 generates work state information or apparatus state information for each layer manufacturing apparatus 200. The work state information generated by the state information generation unit may be information on how many percents of the partial models allocated to each layer manufacturing apparatus 200 are formed, and the apparatus state information generated by the state information generation unit may include information on how much amounts of consumables accommodated in each layer manufacturing apparatus 200 remain. The consumables used in the layer manufacturing apparatuses 200 may be layered materials used to form the three-dimensional shape 10.

The work state information or the apparatus state information generated by the state information generation unit may be transmitted to the electronic device 100. The work state output unit of the electronic device 100 may receive the work state information or the apparatus state information from the state information generation unit of each layer manufacturing apparatus 200 and output the work state information or the apparatus state information on the electronic device 100, and FIG. 7 illustrates an example of a screen output from the state information generation unit.

In the present embodiment illustrated in FIG. 7, the work state information or the apparatus state information of the layer manufacturing apparatus 200 is output to the electronic device 100, but there may also be an embodiment in which each of the layer manufacturing apparatuses 200 includes a separate individual display apparatus and a work state information or apparatus state information of an individual layer manufacturing apparatus 200 is output to the display apparatus. The user may directly confirm the work state information or the apparatus state information output to the electronic device 100 or may confirm the work state information or the apparatus state information through a communicable terminal by accessing the electronic device 100 through the communicable terminal.

First Embodiment—Three-Dimensional Layer Manufacturing Method

Hereinafter, a three-dimensional layer manufacturing method according to the first embodiment of the present invention will be described in detail.

The three-dimensional layer manufacturing method according to the first embodiment of the present invention may utilize the three-dimensional layer control system according to the first embodiment of the present invention described above, and may include steps a10) to f10).

In step a10), the information of the three-dimensional shape to be layered is input to the electronic device. A subject inputting the information of the three-dimensional to the electronic device may be a user or an automated device.

In step b10), the three-dimensional shape is divided into at least two partial models by the division unit included in the electronic device. In the present embodiment, the three-dimensional shape divided by the division unit may be the three-dimensional shape 10 illustrated in FIG. 3, and as illustrated in FIG. 3, in step b10) of the present embodiment, the division unit may divide the three-dimensional shape 10 into the first partial model 11 and the second partial model 12. The first partial model 11 and the second partial model 12 are divided on the basis of directions in which the nozzles of the layer manufacturing apparatuses are inserted when the directions in which the nozzles of the layer manufacturing apparatuses are inserted are the same as each other, and in FIG. 3, the nozzles may move from an upper side to a lower side and then sequentially form the first partial model 11 and the second partial model 12 while moving in a horizontal direction. However, the formation of the first partial model 11 and the second partial model 12 is not performed in step b10).

In step c10), the work information generation unit generates the work information for each partial model, and the electronic device including the work information generation unit allocates the work information for each partial model to at least two or more layer manufacturing apparatuses. In the work information for each partial model allocated in step c10), the order in which the layer manufacturing apparatuses are installed should be considered, the first partial model 11 is allocated to the layer manufacturing apparatus first forming the partial model, the second partial model 12 is allocated to the layer manufacturing apparatus forming the partial model later, and in step d10), the allocated partial models are sequentially formed for each layer manufacturing apparatus to which the partial models are allocated to layer and form one three-dimensional shape.

In step d10), which is a step performed in the layer manufacturing apparatus, the nozzle is inserted into the background material, and then supplies and sprays the layered material to form the partial model.

The three-dimensional layer manufacturing method according to the first embodiment of the present invention may further include step b11). Step b11) is performed between step b10) and step c10) and is a step of optimizing the path of the nozzle for each partial model divided in step b10), and the work information for each partial model generated in step c10) performed after step b11) may include path information of the nozzle calculated in step b11).

More specifically, in step b11), each partition model divided in step b10) is divided into a plurality of layers layered on one side, a plurality of polygons included in each layer and spaced apart from each other are recognized, the recognized polygons are divided into a plurality of parts including polygons in contact with each other, and the path information of the nozzle is calculated so that the nozzle sequentially form the plurality of parts. In FIG. 4, a model including the plurality of parts divided in step b11) is illustrated.

Step e10) is performed simultaneously with step d10), and in step e10), the state information generating unit of the layer manufacturing apparatus generates the work state information or the apparatus state information of the layer manufacturing apparatus and transmits the work state information or the apparatus state information to the electronic device. Step f10) is performed simultaneously with step e10), and in step f10), the work state information or the apparatus state information transmitted in step e10) is received, and the work state information or the apparatus state information is output for each layer manufacturing apparatus. That is, step e10) and step f10) are steps of performing monitoring so that the user may confirm a working state or an apparatus state for each layer manufacturing apparatus.

Second Embodiment—Three-Dimensional Layering Control System

A three-dimensional layering control system according to a second embodiment of the present invention may include an electronic device 100 and a layer manufacturing apparatus 200, similar to the three-dimensional layering control system according to the first embodiment of the present invention illustrated in FIG. 1. In this case, the number of layer manufacturing apparatuses 200 may be at least one or more. In the present embodiment, the electronic device 100 may include a division unit, a work information generation unit, a path optimization unit, a transmission unit, and a work state output unit, and the electronic device 100 and respective detailed components included in the electronic device 100 of the second embodiment are the same as those of the first embodiment, and a description therefor will be thus omitted. The layer manufacturing apparatus 200 may include a reception unit, a control unit, a state information generation unit, a moving unit, a first head module, and a second head module. The reception unit and the state information generation unit included in the layer manufacturing apparatus 200 are the same as those of the first embodiment described above, and a description therefor will thus be omitted.

The control unit controls each of the head modules and the moving unit, which will be described later.

FIG. 8 illustrates a three-dimensional layering control system according to a second embodiment of the present invention. As illustrated in FIG. 8, the layering control system according to the second embodiment of the present invention may further include a first stage 310, a second stage 320, and a transfer unit 400 in addition to the electronic device 100 and the layer manufacturing apparatus 200.

The first stage 310 and the second stage 320 are portions having upper surfaces on which the layer manufacturing apparatus 200 forms a three-dimensional shape, and as illustrated in FIG. 8, containers 20 in which the three-dimensional shape is formed may be disposed on the upper surfaces of the first stage 310 and the second stage 320. The containers 20 may be placed on the upper surfaces of the first stage 310 and the second stage 320 without taking special measures or grooves corresponding to lower surfaces of the containers 20 may be formed in the upper surfaces of the first stage 310 and the second stage 320 so that the containers 20 may be stably seated on the upper surfaces of the first stage 310 and the second stage 320. Even though the grooves are not formed, the containers 20 may be stably seated on the upper surfaces of the first stage 310 and the second stage 320 through other manners such as an adhesive. The containers 20 may be disposed to correspond to positions of nozzles included in the head modules when the stages are positioned below the head modules.

The transfer unit 400 illustrated in FIG. 8 may move the first stage 310 and the second stage 320 in an X-axis direction. The transfer unit 400 may be implemented in various forms to move the first stage 310 and the second stage 320 in the X-axis direction, but the transfer unit 400 in the three-dimensional layering control system according to the second embodiment of the present invention may be implemented in the form of a chain conveyor for precise movement control of the stages to move the stages in the X-axis direction. However, the present invention does not limit the transfer unit 400 to the chain conveyor, and may be implemented in any form as long as it may precisely move the stages in the X-axis direction. The transfer unit 400 may be driven under the control of a control unit included in the electronic device 100 or the layer manufacturing apparatus 200. The transfer unit 400 should move the first stage 310 and the second stage 320 to correct positions of each of the head modules. Accordingly, in the present embodiment, the layer manufacturing apparatus 200 may further include a positioning sensor capable of sensing positions of the first stage 310 and the second stage 320, a motor (e.g., a servo motor or a step motor) capable of precisely controlling the transfer unit 400, a motor driver, and a stopper.

As illustrated in FIG. 8, the layer manufacturing apparatus 200 may include a first head module 210*a* and a second head module 210b. The number of head modules included in the layer manufacturing apparatus 200 of the present embodiment is two, but the three-dimensional layering control system according to the present invention does not limit the number of head modules included in the layer manufacturing apparatus 200 to two as in the present embodiment, and the layer manufacturing apparatus 200 may include one or more head modules according to design particulars or as needed. The head modules are portions actually form the entirety or a portion of the three-dimensional shape. In the present embodiment illustrated in FIG. 8, the number of head modules is two, and thus, the two head modules may form the same three-dimensional shape or form different three-dimensional shapes, respectively.

FIG. 9 is an enlarged view of the first head module 210a illustrated in FIG. 8.

Since the first head module 210a and the second head module 210b have the same basic configuration, the first head module 210a and the second head module 210b will be described in detail with reference to FIG. 9. As illustrated in FIG. 9, the first head module 210a may include nozzles 220, body portions 221, a connection member 241, and a fixing frame 242.

The fixing frame 242 is a kind of structure for fixing and arranging a plurality of nozzles 220. In the three-dimensional layering control system according to the second embodiment of the present invention, the fixing frame 242 may have a shape extending in a '⊏' shape as illustrated in FIG. 9, and the nozzles 220 may be coupled to side surfaces of the fixing frame 242 so as to be spaced apart from each other by a predetermined interval. However, the present invention does not limit a structure of the fixing frame 242 to the '⊏' shape illustrated in FIG. 9, and a fixing frame 242 having a '▢' shape may be used in order to prevent excessive vibrations from being transferred to the nozzles 220 or the body portions 221 at the time of an operation of the layer manufacturing apparatus 200. As illustrated in FIG. 9, the connection member 241 connects the fixing frame 242 and a moving unit to be described later to each other.

The nozzles 220 are members forming a three-dimensional shape by spraying a layered material, and may be coupled to lower ends of the body portions 221. As illustrated in FIG. 9, a plurality of nozzles 220 may be disposed in one head module, and body portions 221 of which number corresponds to the number of nozzles 220 may also be provided. The body portions 221 are portions in which the layered material is accommodated, and may have upper ends 222 connected to a pressure source (not illustrated) or a pressure tank (not illustrated) through pressure lines to receive the layered material supplied from the pressure tank or receive a pressure supplied from the pressure source, thereby allowing the layered material to be sprayed from the nozzles 220. The plurality of body portions 221 may be connected to the pressure tank or the pressure source in parallel.

The moving unit of the layer manufacturing apparatus 200 serves to move the head module 210a. The reason for moving the head module 210a by the moving unit is that a desired three-dimensional shape may be precisely expressed only when the layered material is sprayed while moving the nozzles 220 included in the head module 210a. The moving unit may move the head module 210a in a three-dimensional direction. Specifically, the moving unit may move the first head module 210a in X-axis, Y-axis, and Z-axis directions orthogonal to each other. Since the moving unit moves one head module, the nozzles 220 included in the head module moved by the moving unit form the same three-dimensional shape. Through this configuration, the three-dimensional layering control system according to the present embodiment may be suitable for mass production.

Referring to FIG. 9, the moving unit may include an X-axis moving member 231, a Y-axis moving member 232, a Z-axis moving member 233, and an X-axis rail 234 in order to move the first head module 210a.

As illustrated in FIGS. 8 and 9, the X-axis rail 234 is formed to extend in a direction in which the transfer unit 400 moves the stages, that is, the X-axis direction. The X-axis moving member 231 connected to the first head module is coupled to the X-axis rail 234 and is configured to be slidable in the X-axis direction. The Y-axis moving member 232 is coupled to one surface of the X-axis moving member 231, a rail is formed on one surface of the X-axis moving member 231 so that the Y-axis moving member 232 is slid to be movable, and similarly, a rail is formed on one surface of the Y-axis moving member 232 so that the Z-axis moving member 233 is slid in the Z-axis direction to be movable. The head module is coupled to the Z-axis moving member 233 through a connection member 241. Although not illustrated in the drawings, the moving unit may include power sources capable of separately driving the X-axis moving member 231, the Y-axis moving member 232, and the Z-axis moving member 233, and the power sources may be implemented to include apparatuses capable of precise movement control of the respective moving members and may be controlled by the control unit described above. Specifically, a linear motor may be used as a power source for precise control of the X-axis moving member 231 and the Y-axis moving member 232, and since the Z-axis moving member 233 moves along a Z axis and is then fixed, a servo motor may be used as a power source moving the Z-axis moving member 233.

As illustrated in FIG. 8, each of the first head module 210a and the second head module 210b may be coupled to one X-axis rail 234 through the X-axis moving member 231. As the first head module 210a and the second head module 210b share one X-axis rail 234, a moving structure of each head module may be more economically configured, and a plurality of head modules may be combined with each other, which is advantageous for a process of mass-producing the three-dimensional shape, that is, mass production. Different head modules coupled onto the X-axis rail 234 may be disposed to be spaced apart from each other by a predetermined distance. In the present embodiment, the first head module 210a and the second head module 210b share one X-axis rail 234 with each other, but when the first head module 210a and the second head module 210b are spaced apart from each other by a predetermined distance and do not interfere with each other's movement, the first head module 210a and the second head module 210b may form different three-dimensional shapes, respectively, which may be advantageous in terms of diversification or production speed improvement of product. An operation embodiment in which the first head module 210a and the second head module 210b form different types of three-dimensional shapes, respectively, will be described later.

FIGS. 10 and 11 schematically illustrate that the nozzles 220 and the body portions 221 are implemented in different manners in the three-dimensional layering control system according to the second embodiment of the present invention, when viewed from the front.

First, in the layering control system according to the second embodiment of the present invention, the nozzles 220 and the body portions 221 may be implemented as a valve type as illustrated in FIG. 10. The valve type is a manner in which a pressure tank 250 in which a large amount of layered material is accommodated and the body portions 221 are connected to each other through a first pressure line 2, the respective body portions 221 are connected to each other in parallel through second pressure lines 3 on the first pressure line 2, the pressure tank 250 supplies the layered material to the respective body portions 221 to allow the layered material to be sprayed from the nozzles 220 coupled to lower ends of the respective body portions 221, as illustrated in FIG. 10. Although omitted in FIG. 10, an apparatus installed at a portion where the first pressure line 2 and the second pressure lines 3 are connected to each other may be a manifold 223 illustrated in FIG. 9, a separate valve may be formed in the pressure tank 250, the first pressure line 2, the manifold 223, or the body portions 221, and the control unit of the layer manufacturing apparatus may open or close the valve to control spraying of the layered material. Various types of valves may be applied as the valve formed in the pressure tank 250, the first pressure line 2, the manifold 223, or the body portions 221, and a solenoid valve may be typically applied. In a case where individual valves are applied to the manifold 223 or the second pressure lines 3, the control unit of the layer manufacturing apparatus may individually control the valves to select the body portions 221 and the nozzles 220 to be used or not to be used.

The first pressure line 2 is omitted in FIG. 9, but the first pressure line 2 may have a distal end connected to first holes 224 formed in the body portions 221 to supply the layered layer transferred from the pressure tank 250 into the manifold 223. Second holes 225 may be formed on a side surface of the manifold 223, the second holes 225 and the upper ends 222 of the body portions 221 may be connected to each other through the second pressure lines 3, and the layered material supplied to the manifold 223 may sequentially move through an internal space, the second holes 225, and the second pressure lines 3 and may be supplied to the respective body portions 221 and the nozzles 220. In the present embodiment, with respect to all the body portions 221, lengths of the second pressure lines 3 connecting the second holes 225 of the manifold 223 and the upper ends 222 of the body portions 221 to each other may be made to be the same as each other to make amounts of the layered material supplied to the body portions 221 the same as each other.

The nozzles 220 and the body portions 221 may be implemented as a syringe type as illustrated in FIG. 11. The syringe type is a manner in which the layered material is accommodated in the body portions 221 themselves, the body portions 221 and a pressure source 260 are connected to each other through pressure lines, and the pressure source 260 transfers only a pressure to the respective body portions 221 to allow the layered material to be sprayed from the nozzles 220. The pressure transmitted from the pressure source 260 may be an air pressure, and packings 226 dividing air pushed by the layered material 12 and the pressure source 260 may be inserted into the body portions 221 and may be pushed by the pressure transmitted from the pressure source 260 to push the layered material 12 accommodated in the body portions 221 to the nozzles 220. The syringe type easily copes with a change in the layered material at the time of changing the layered material and is configured at a relatively low cost, but has a disadvantage that a replacement and setting time occurs at the time of exhausting the layered material during a work, and the valve type may be continuously used unlike the syringe type, but is configured at a relatively high cost. In the present embodiment, as illustrated above, the valve-type body portions 221 may be used.

As illustrated in FIGS. 10 and 11, the nozzles 220 may spray the layered material 12 in a state in which they are inserted into the containers 20. A direction in which the nozzles 220 are inserted into the containers 20 may be the Z-axis direction, and the background material 11 may be accommodated in the containers 20. The background material 11 and the layered material 12 forming the three-dimensional shape may be different types of materials. Specifically, the background material 11 and the layered material 12 may be different in at least one or more of a viscosity, a color, and a component. Since the three-dimensional shape may be formed inside the background material 11, the background material 11 may have a transparency of a predetermined level or more.

The division unit included in the electronic device 100 described above receives the three-dimensional shape input to the electronic device 100, and serves to set the three-dimensional shape as one partial model without dividing the three-dimensional shape or divide the three-dimensional shape into at least two or more partial models. In this case, the number of partial models obtained by dividing the three-dimensional shape may be the number of head modules included in the layer manufacturing apparatus.

The three-dimensional shape received by the three-dimensional layering control system according to the second embodiment of the present invention and the partial models obtained by dividing the three-dimensional shape by the division unit may be the three-dimensional shape 10 illustrated in FIG. 2A and the first partial model 11 and the second partial model 12 illustrated in FIG. 2B, respectively, as described above in the first embodiment of the present invention. As described above in the first embodiment, a criterion for dividing the three-dimensional shape 10 into the first partial model 11 and the second partial model 12 may be a type of a layered material forming each partial model, and the first partial model 11 and the second partial model 12 are also the same as those of the first embodiment, and a description therefor will thus be omitted.

The first partial model 11 and the second partial model 12 divided by the division unit may be allocated to and divided and formed by the head modules of the layer manufacturing apparatus 200, respectively. In more detail, the first head module 210a described above forms the first partial model 11, and the second head module 210b forms the second partial model 12 in the container in which the first partial model 11 is formed, such that the first head module 210a and the second head module 210b may form one three-dimensional shape 10. However, in order to do this, the first head module 210a and the second head module 210b should form the first partial model 11 and the second partial model 12 in the time order, respectively. Accordingly, when the second partial model 12 is formed using the nozzles, the first partial model 11 that has been already formed should not be damaged by the nozzles, and accordingly, the division unit should grasp a time relationship in which the partial models will be formed and divide the received three-dimensional shape. More specifically, in a case where it is assumed that the nozzles are inserted from upper sides of the containers to lower sides of the containers to form the partial models, even though a partial region of the first partial model 11 formed first and a partial region of the second partial model 12 overlap each other, the division unit should divide the three-dimensional shape 10 so that the overlapping partial region of the first partial model 11 is not positioned above the overlapping partial region of the second partial model 12.

The path optimization unit optimizes a path of the nozzle for each partial model divided by the division unit.

A state in which each of the first partial model 11 and the second partial model 12 divided in the division unit is divided in the layering direction is similar to that of the first embodiment, and thus, is the same as that illustrated in FIG. 3, and an operation of the path optimization unit is also the same as that of the first embodiment described through an alphabet B shape illustrated in FIG. 4, and a description therefor will thus be omitted.

The work information generating unit generates work information for each partial model including information of the partial models divided by the division unit and the path information of the nozzle for each partial model calculated by the path optimization unit. The work information for each partial model generated by the work information generation unit may be stored in a file having a predetermined name and be transferred to the layer manufacturing apparatus 200 through the transmission unit, the layer manufacturing apparatus 200 may receive the file by the reception unit, and the control unit of the layer manufacturing apparatus 200 may allocate the work information for each partial model included in the file to the respective head modules. Since the first partial model 11 of the partial models divided in the division unit should be formed first, the information of the first partial model 11 may be allocated to the first head module 210a positioned ahead among a plurality of head modules arranged side by side, and since the second partial model 12 of the partial models divided in the division unit is formed after the first partial model 11, the information of the second partial model 12 may be allocated to the second head module 210b. The meaning of the layer manufacturing apparatus positioned ahead is that the partial model is formed first.

FIG. 12 schematically illustrates a process in which a work is performed by allocating the work information of the first partial model 11 to the first head module 210a and allocating the work information of the second partial model 12 to the second head module 210b, as described above, that is, a first operation embodiment of the three-dimensional layering control system according to the second embodiment of the present invention.

The first head module 210a may first form the first partial models 11 inside the containers 20, and when the formation of the first partial models 11 is completed, the transfer unit 400 may move the first stage 310 on which the first partial models 11 are formed to the second head module 210b. In a process of moving the first stage 310 to the second head module 210b by the transfer unit 400, the second head module 210b may move upward, that is, in the Z-axis direction. Since the second stage 320 is disposed on the left side of the first stage 310, the second stage 320 is also moved to the first head module 210a by the transfer unit 400, and the first head module 210a may also move upward, that is, in the Z-axis direction in a process of moving the second stage 320 to the first head module 210a by the transfer unit 400. Thereafter, the second head module 210b may form three-dimensional shapes 10 by forming the second partial models 12 inside the containers 20 positioned on an upper surface of the first stage 310, as illustrated in FIG. 12, and the first head module 210a may allow the three-dimensional shapes to be continuously produced by forming the first partial models 11 inside the containers 20 positioned on an upper surface of the second stage 320.

As illustrated in FIG. 12, a first pressure tank 251 is connected to body portions of the first head module 210a, and a second pressure tank 252 is connected to body portions of the second head module 210b. The first pressure tank 251 and the second pressure tank 252 may transfer different layered materials to the body portions each connected to the first pressure tank 251 and the second pressure tank 252. In this manner, in a case where the first partial model 11 and the second partial model 12 are made of different materials, a washing and exchanging process of the layered material accommodated in the pressure tank as in the conventional manner is omitted, such that a formation rate of the three-dimensional shape may be improved.

As illustrated in FIG. 12, in a case where the three-dimensional layering control system according to the present invention operates as in the first operation embodiment, layouts (positions and numbers) of nozzles individually included in the first head module 210a and the second head module 210b may be the same as each other. The reason is that the first head module 210a and the second head module 210b individually form the partial models, respectively, and thus, the layouts of the nozzles should be the same as each other in order for the first head module 210a and the second head module 210b to form one three-dimensional shape together.

FIG. 13 schematically illustrates a second operation embodiment of the three-dimensional layering control system according to the second embodiment of the present invention.

In the three-dimensional layering control system according to the second embodiment of the present invention, each of the first head module 210a and the second head module 210b does not form one three-dimensional shape together as in the first operation embodiment described above, and there may be an embodiment in which each of the head modules forms one three-dimensional shape, as illustrated in FIG. 13.

The transmission unit included in the electronic device 100 may transmit the work information for each partial model generated by the work information generation unit to individual layer manufacturing apparatuses in a wired manner or a wireless manner or may transmit the work information for each partial model to the individual layer manufacturing apparatuses using a removable memory such as a USB. In a case where the transmission unit transmits the work information for each partial model in the wired manner or the wireless manner, each layer manufacturing apparatus may further include a reception unit capable of receiving the work information for each partial model. In a case where a manner of transmitting the generated work information for each partial model to the layer manufacturing apparatus through the removable memory is used in the transmission unit, the electronic device 100 may include a separate connector capable of coupling the removable memory thereto, and when the removable memory is physically coupled to the electronic device 100, the work information for each partial model generated by the work information generating unit may be manually or automatically stored in the removable memory. The work information for each partial model stored in the removable memory may include an identification code capable of identifying the layer manufacturing apparatus that the work information is to be allocated.

The layer manufacturing apparatus 200 may also include a connector that may be physically coupled to the removable memory, similar to the electronic device 100, and when the removable memory is coupled to the layer manufacturing apparatus, one of the work information for each partial model included in the removable memory may be manually or automatically transmitted to the layer manufacturing apparatus.

Through the process described above, the three-dimensional shape 10 may be formed inside the container 20 illustrated in FIG. 6 as in the first embodiment of the present invention.

The state information generation unit of the layer manufacturing apparatus 200 generates work state information or apparatus state information for each head module, and the information generated by the state information generation unit may be transmitted to the electronic device 100 and be output as illustrated in FIG. 7, as in the first embodiment of the present invention described above.

Second Embodiment—Three-Dimensional Layer Manufacturing Method

Hereinafter, a three-dimensional layer manufacturing method according to the second embodiment of the present invention will be described.

The three-dimensional layer manufacturing method according to the second embodiment of the present invention may utilize the three-dimensional layer control system according to the second embodiment of the present invention described above, and may include steps a20) to f20).

In step a20), the information of the three-dimensional shape to be layered is input to the electronic device. A subject inputting the information of the three-dimensional to the electronic device may be a user or an automated device. The three-dimensional shape input in step a20) may be the three-dimensional shape 10 illustrated in FIG. 2.

In step b20), the electronic device generates the work information of the three-dimensional shape and transmits the work information of the three-dimensional shape to the layer manufacturing apparatus. As described above in the three-dimensional layering control system according to the second embodiment of the present invention, the layer manufacturing apparatus may include at least one or more head modules.

In step b21) included in step b20), the division unit of the electronic device divides the three-dimensional shape into at least one or more partial models. The number of partial models obtained by dividing the three-dimensional shape in step b21) may be the same as the number corresponding to the number of head modules included in the layer manufacturing apparatus. In step b21), the three-dimensional shape may be divided on the basis of a direction in which the nozzles are inserted, and in a case where the number of head modules included in the layer manufacturing apparatus is one, in step b21), the three-dimensional shape is not divided into a plurality of partial models, and may be set as one partial model.

In step b22), the work information generation unit of the electronic device generates the work information for each partial model and transmits the generated work information to the layer manufacturing apparatus. In step b22), paths of the nozzles for each partial model divided in step b21) may be calculated to be optimized, and the generated work information for each partial model may include the calculated path information of the nozzles. More specifically, in step b22), each partial model divided in step b21) is divided into a plurality of layers layered on one side, and a plurality of polygons included in each of the layers and spaced apart from each other are recognized. Thereafter, in step b22), the plurality of polygons may be divided into a plurality of parts including polygons in contact with each other, and path information of the nozzles may be calculated so that the nozzles sequentially form the plurality of parts. A state in which the three-dimensional shape is divided into the plurality of parts in step b22) is illustrated in FIG. 8.

In step c20), the layer manufacturing apparatus receives the work information of the three-dimensional shape and allocates the work information to each of at least one or more head modules included in the layer manufacturing apparatus. In this case, work information of a partial model positioned in a direction in which the nozzles are inserted, of the divided partial models, may be allocated to a head module disposed ahead in order. The reason is that in a case where a partial model positioned in an opposite direction to the direction in which the nozzles are inserted is formed ahead of the partial model positioned in the direction in which the nozzles are inserted, when the partial model positioned in the direction in which the nozzles are inserted is formed, the partial model formed first may be damaged by the nozzles for forming the partial model positioned in the direction in which the nozzles are inserted.

In step d20), the three-dimensional shape is formed on the basis of the work information allocated to each head module, and in a case where different partial models are formed for each head module as described above, the partial model positioned in the direction in which the nozzles are inserted to the partial model positioned in the opposite direction to the direction in which the nozzles are inserted may be sequentially formed.

In step d20), the partial models and the three-dimensional shape may be formed by inserting the nozzles into the background material and then spraying the layered material from the nozzles.

Step e20) is performed simultaneously with step d20), and in step e20), the state information generation unit of the layer manufacturing apparatus generates the work state information or the apparatus state information for each head module, and transmits the work state information or the apparatus state information to the electronic device.

Step f20) is performed simultaneously with step e20), and in step f20), the work state information or the apparatus state information transmitted in step e20) is received and the work state information or the apparatus state information for each head module is output, and step f20) may be performed as illustrated in FIG. 7.

Third Embodiment—Three-Dimensional Layer Manufacturing Method

A three-dimensional layer manufacturing method according to a third embodiment of the present invention may be performed by the electronic device 100 illustrated in FIG. 1 and the layer manufacturing apparatus 200 receiving work information from the electronic device 100.

The three-dimensional layer manufacturing method according to a third embodiment of the present invention may include step a30), step b30), step c30), step d30), and step e30). Steps a30) to d30) of steps a30) to e30) described above may be performed by the electronic device 100 described above, and step e30) that is last performed may be performed by the layer manufacturing apparatus 200.

Step a30) is a step of receiving information of a three-dimensional shape to be layered, and is a step in which a user or an automated device inputs information of a three-dimensional shape, that is, 3D modeling information, to the electronic device 200. Step b30) is a step in which the electronic device 200 divides the three-dimensional shape input in step a30) into a plurality of layers layered on one side. Step b30) is the same as FIG. 3 illustrating that each of the first partial model 11 and the second partial model 12 divided by the division unit is divided in a layering direction and divided into a plurality of layers layered on one side. In step b30), the electronic device 200 may divide the three-dimensional shape into the plurality of layers layered on one side so that a thickness of the layered material sprayed from the nozzles and a height of the divided layers are the same as each other, in consideration of a diameter of the nozzles included in the layer manufacturing apparatus.

In step d30), polygons recognized for each layer in step c30) are classified and grouped into polygons in contact with each other, and the polygons grouped in step d30) are called parts.

FIG. 14 schematically illustrates a state in which the three-dimensional shape is divided into a total of eleven parts by performing step d30) on the layers divided in step b30) and the polygons recognized in step c30).

As illustrated in FIG. 14, an alphabet B having a three-dimensional shape may be divided into a first part PT1, a sixth part PT6, and a tenth part PT10, an alphabet O may be divided into a second part PT2 and a seventh part PT7, an alphabet N may be divided into a third part PT3, a fourth part PT4, and a ninth part PT9, and an alphabet G may be divided into a fifth part PT5, an eighth part PT8, and an eleventh part PT11.

Hereinafter, a process of dividing a plurality of polygons included in the three-dimensional shape into parts as illustrated in FIG. 14 will be described in detail with reference to the accompanying drawings.

In the three-dimensional layer manufacturing method according to an embodiment of the present invention, step d30) may include steps d31) and d32).

Step d31) is a step of generating a part list. The part list is a list in which parts generated in step d32) to be described later are stored, and parts are not included in a part list generated before step d32) is performed, that is, for the first time.

In step d32), the polygons recognized in step c30) are selected in a predetermined order, it is determined whether or not the selected polygon and the uppermost polygon of a part selected while performing postorder traversal among parts included in the part list are in contact with each other, and in a case where the selected polygon and the uppermost polygon of the part selected while performing the postorder traversal are in contact with each other, the selected polygon is incorporated into the corresponding part. However, in some cases, the polygon selected in step d32) may not be in contact with the uppermost polygon of a specific part, or the part may not be included in the part list. In this case, in step d32), the selected polygon may be classified into a separate part and be included in the part list.

Step d32) is performed on all the polygons, such that all the polygons may be divided into separate parts, and the divided parts may be given order numbers according to a preset criterion. The preset criterion may be an order in which nozzles are inserted to form parts, and in the present embodiment, the parts are formed in the order from the lower side to the upper side and from the left side to the right side. That is, a part of which a portion is positioned on the lower side on the basis of a vertical direction has the preceding order number, and in a case where individual portions of the plurality of parts are positioned on a layer having the same height, a part of which the corresponding portion is positioned on the left side may have the preceding order number, and order numbers determined accordingly may be the first to eleventh parts illustrated in FIG. 14.

FIG. 15 is an enlarged view of lower portions of the alphabets B and 0 in the three-dimensional shape illustrated in FIG. 14, and step d32) will be described in more detail with reference to FIG. 15.

In step d32), a first polygon PG1 of a first layer L1 illustrated in FIG. 15A is selected, and it is determined whether or not the selected first polygon PG1 is in contact with the uppermost polygon of a part included in the part list. In this case, a criterion for selecting parts included in the part list may be a postorder traversal method of selecting parts from a part to be formed later to a part to be formed first. However, when step d32) described above is first performed, since there is no part included in the part list, in step d32), the first polygon PG1 is divided into a separate part, that is, the first part PT1, and the first part PT1 is then included in the part list. Thereafter, in step d32), a second polygon PG2 of the first layer L1 illustrated in FIG. 15 is selected, and it is determined whether or not the selected second polygon PG2 is in contact with the uppermost polygon of the first part PT1 included in the part list, that is, the first polygon PG1. However, since the first polygon PG1 and the second polygon PG2 are not in contact with each other as illustrated in FIG. 15A, in step d32), the second polygon PG2 may be divided into the second part PT2. Although not illustrated in FIG. 15, polygons included in the first layer L1 of the alphabets N and G having the three-dimensional shape may also be divided into separate parts, and the divided parts may be included in the part list.

In step d32), as a criterion for selecting a target polygon to be incorporated into a part, a polygon positioned on the lower side may be selected first, and in a case where a plurality of polygons are included in the same layer, a polygon positioned on the left side may be selected.

When the part generation for the polygons included in the first layer L1 ends in step d32), a polygon on the left side among polygons included in a second layer positioned above the first layer L1 is selected, the selected polygon and parts in the part list are selected while performing postorder traversal, and it is then determined whether or not the uppermost polygon of the selected part is in contact with the selected polygon. In this case, the parts in the part list may be selected in postorder from a part to be formed later, which is to prevent the nozzles from scratching the part formed first because the nozzles are inserted to form the parts while spraying the layered material.

The postorder traversal is one of traversal methods of a binary tree, and is a manner of first selecting a part positioned on the lower side on the basis of a height direction and first selecting a part positioned on one side on the basis of a left and right direction. This is because, in the present embodiment, a criterion direction of the part selected first in the left and right direction is the right side. The reason is that a part positioned on the right side is formed later. However, this is only the direction determined in the present embodiment, and a direction of the postorder traversal may vary depending on the criterion direction of the part that the nozzles are inserted to form.

Step d32) for the second layer will be described with reference to FIG. 15A. In step d32), a third polygon PG3 is selected, and it is then determined whether or not the third polygon PG3 is in contact with the uppermost polygon of parts included in the parts list. Since the third polygon PG3 is in contact with the first polygon PG1 of the first part PT1 as illustrated in FIG. 15A, the third polygon PG3 is incorporated into the first part PT1, as illustrated in FIG. 15B, and similarly, a fourth polygon PG4 is incorporated into the second part PT2. Thereafter, it may be determined whether or not a fifth polygon PG5 and a sixth polygon PG6 included in a third layer are incorporated into parts.

FIG. 16 schematically illustrates a process in which step d32) is further performed.

As illustrated in FIG. 16A, a seventh polygon PG7 and an eighth polygon PG8 are in contact with an upper portion of the first part PT1. In step d32) of the present embodiment, the seventh polygon PG7 is selected ahead of the eighth polygon PG8, and thus, the seventh polygon PG7 is incorporated into the first part PT1. Thereafter, in step d32), it is inspected whether or not the eighth polygon PG8 also comes in contact with the uppermost polygon of a specific part of the parts included in the part list. Since the seventh polygon PG7 becomes the uppermost polygon of the first part PT1 while being incorporated into the first part PT1, the eighth polygon PG8 is not in contact with the uppermost polygon of the specific part. Accordingly, as illustrated in FIG. 16B, the eighth polygon PG8 is divided into a separate part, that is, the sixth part PT6. Similar to a ninth polygon PG9 and a tenth polygon PG10 of the second partial model 12, the ninth polygon PG9 selected first is divided into the second part PT2, the tenth polygon PG10 selected later is divided into the seventh part PT7, which is a separate part, and these parts are then included in the part list.

FIG. 17 also schematically illustrates a process in which step d32) is further performed.

As illustrated in FIG. 17A, the uppermost polygons of the first part PT1 and the sixth part PT6 may be in contact with an eleventh polygon PG11. However, since parts included in the part list are selected while performing the postorder traversal in step d32), the sixth part PT6 is selected first and step d32) is performed, and thus, the eleventh polygon PG11 may be included in the sixth part PT6, as illustrated in FIG. 17B. When step d32) is performed on all the polygons in this manner, the three-dimensional shape may be divided into the plurality of parts as illustrated in FIG. 14.

In step e30), the three-dimensional shape is formed by spraying a layered material having a predetermined viscosity or more using the nozzle to sequentially form the parts divided in step d30).

FIG. 18 schematically illustrates a process in which step e30) is performed.

As illustrated in FIG. 18, in step e30), a part having the most preceding order number among the parts divided by designating the order numbers in the steps described above is formed first. In step e30), when one part is formed, a polygon positioned on the lowermost side may be formed first, which is to prevent a phenomenon in that the nozzle may scratch a polygon formed first on the upper side in a case where the polygon positioned on the upper side is formed first and a polygon formed on the lower side is formed later.

Step e30) will be described in detail with reference to FIG. 18. As illustrated in FIG. 18A, in step e30), the nozzle 50 may form a first polygon PG1 scheduled to be formed while rotating in a clockwise direction or a counterclockwise direction using in one stroke drawing while being positioned on the lowermost side. The reason is that the first polygon PG1 is a polygon having a predetermined area when viewed from the top. That is, in FIG. 18, the first polygon PG1 has been only expressed as a line for convenience of explanation.

Thereafter, in step e30), the nozzle 50 forms a third polygon PG3 scheduled to be formed, as illustrated in FIG. 18B, and thereafter, in step e30), the nozzle 50 form a fifth polygon PG5 scheduled to be formed, as illustrated in FIG. 18C. That is, in step e30) of the present embodiment, all polygons included in one layer are not formed at a time, and polygons are formed for each part. In a manner as in step e30), when the nozzle 50 forms one part, the nozzle 50 does not repeat spraying of the layered material and stopping of the spraying of the layered material or may decrease the number of times of repetition of the spraying of the layered material and the stopping of the spraying of the layered material even though the nozzle repeats spraying of the layered material and stopping of the spraying of the layered material. Therefore, a distance by which the nozzle moves in a state in which the spraying of the layered material is stopped is shortened as compared with the conventional layering method, such that a stringing phenomenon may be minimized and an output speed of the three-dimensional shape may be increased. A color of the layered material sprayed from the nozzle 50 may be different for each position, and thus, precise and various three-dimensional shapes may be realistically expressed.

In the three-dimensional layer manufacturing method according to the third embodiment of the present invention, a product having the three-dimensional shape as illustrated in FIG. 6 may be manufactured through the process as described above.

In the three-dimensional layer manufacturing method according to the third embodiment of the present invention, step d30) may further include step d33).

In step d33), regions of the respective parts divided through step d32) are compared with each other, and in a case where a region of the first part formed first overlaps the region of the second part formed later than the first part and the overlapping region of the first part is positioned above the overlapping region of the second part, the corresponding region of the first part is divided into a third part separate from the first part, and an order number is designated so that the third part is formed later than the second part. First to third parts to be described later are irrelevant to the first to third parts described above.

FIG. 19 schematically illustrates a process in which step d33) is performed.

A three-dimensional shape illustrated in FIG. 19A is in a state in which it is divided into a first part PT1, a second part PT2, and a third part PT3 through step a30), step b30), step c30), step d31), and step d32) performed previously. As illustrated in FIG. 19, since a horizontal region W1 from a first line L1 to a second line L1 in the third part PT3 to be formed last overlaps a horizontal region of the first part PT1 formed ahead of the third part PT3 and a horizontal region W2 from the first line L2 to a third line L3 in the third part PT3 overlaps a horizontal region of the second part PT2 formed ahead of the third part PT3, when the nozzle is inserted in order to form the third part PT3, the nozzle scratches the first part PT1 and the second part PT2. In order to solve this problem, in step d33) of the three-dimensional layer manufacturing method according to the third embodiment of the present invention, as illustrated in FIG. 19B, a portion of the first part PT1 overlapping the third part PT3 may be separated into a fourth part PT4, a portion of the second part PT2 overlapping the third part PT3 may be separated into a fifth part PT5, and the fourth part PT4 and the fifth part PT5 may be allowed to be formed after the third part PT3 is output.

In the process described above, when an inspection for whether or not regions of the third part PT3 to be formed later overlap regions of the first part PT1 and the second part PT2 formed previously is performed, the horizontal region of the third part PT3 may be extended in consideration of a thickness of the nozzle, and the inspection for whether or not the regions of the third part PT3 overlap the regions of the first part PT1 and the second part PT2 may be performed.

In FIG. 20, the first line L1 and the third line L3 extended by the thickness of the nozzle, more specifically, a radius of the nozzle is illustrated, and it is inspected whether or not W1 and W2, which are regions of the third part PT3 by the extended lines, overlap the region of the first part PT1 or the second part PT2. In the present embodiment, the first line L1 and the third line L3 have been extended by the radius of the nozzle, but the present invention does not limit an extended length to the radius of the nozzle when inspecting whether or not the regions overlap each other, and the second part PT2 may be extended by an arbitrary offset value, which is a length equal to or greater than the radius of the nozzle, and an inspection for whether or not a region of the second part PT2 by the extended length overlaps the region of the first part PT1 may be performed.

In the inspection for whether or not the regions overlap each other in step d33) described above, when the horizontal regions of the first part formed first and the third part formed later overlap each other and the overlapping region of the first part is positioned above the overlapping region of the third part, the first part is divided. However, in this case, a criterion for the division of the overlapping region may vary depending on a position where the nozzle is inserted and what shape the nozzle has (whether or not the nozzle is bent in a '¬' shape). When it is assumed that the shape of the nozzle positioned inside the container in which the three-dimensional layer manufacturing method according to the present invention is performed is straight and the nozzle forms the three-dimensional shape while reciprocating in a first direction in which the nozzle is inserted into the container and a direction perpendicular to the first direction, in step d33), a region overlapping inspection between the part formed first and the part formed later is performed on the basis of a plane perpendicular to the first direction, and in a case where the part formed first and the part formed later overlap each other and the overlapping region of the part formed later is positioned in the first direction as compared with the overlapping region of the part formed first, the overlapping region of the part formed first may be divided.

Step d30) of the three-dimensional layer manufacturing method according to the third embodiment of the present invention may further include step d34) performed immediately before step e30). In step d34), the electronic device 100 generates a file containing G-Code, which is the work information determined through step a30), step b30), step c30), step d31), step d32), and step d33) as described above and transmits the file to the layer manufacturing apparatus 200 to allow the layer manufacturing apparatus 200 to manufacture the three-dimensional shape through the determined work information. The work information included in the file generated by the electronic device 100 may include information such as information of the three-dimensional shape, information of the divided parts, and a movement path of the nozzle.

The present invention is not limited to the abovementioned exemplary embodiments, but may be variously applied, and may be variously modified without departing from the gist of the present invention claimed in the claims.

Detailed Description of Main Elements

| | |
|---|---|
| 1: user | |
| 10: three-dimensional shape | 11: first partial model |
| 12: second partial model | 20: container |
| 21: lid | 22: inlet |
| 30: background material | 100: electronic device |
| 200: layer manufacturing apparatus | 201: first layer manufacturing apparatus |
| 202: second layer manufacturing apparatus | 210a: first head module |
| 210b: second head module | 50, 220: nozzle |
| 221: body portion | 222: upper end of body portion |
| 223: manifold | 224: first hole |
| 225: second hole | 231: X-axis moving member |
| 232: Y-axis moving member | 233: Z-axis moving member |
| 234: X-axis rail | 241: connection member |
| 242: fixing frame | 250: pressure tank |
| 251: first pressure tank | 252: second pressure tank |
| 260: pressure source | 310: first stage |
| 320: second stage | 400: transfer unit |
| PT1~PT11: first part to eleventh part | |

What is claimed is:

1. A layering control system comprising:
an electronic device receiving information of a three-dimensional shape to be layered;
a layer manufacturing apparatus receiving the information of the three-dimensional shape from the electronic device and forming the three-dimensional shape, the layer manufacturing apparatus further comprising a plurality of nozzles attached to a fixing frame;
a stage having one surface on which the three-dimensional shape is formed;
a transfer unit transferring the stage to the layer manufacturing apparatus in the x direction;
a division unit receiving the information of the three-dimensional shape and dividing the three-dimensional shape into at least two or more partial models; and
a work information generation unit generating work information for each of the partial models,
the number of layer manufacturing apparatuses is plural, and the plurality of layer manufacturing apparatuses receive the work information from the electronic device, are individually allocated the partial models to be formed, and layer and form the partial models, respectively, to layer and form one three-dimensional shape; and
the layer manufacturing apparatuses are arranged side by side and sequentially form the individually allocated partial models to form the one three-dimensional shape.

2. The layering control system of claim 1, wherein the electronic device includes:
a division unit receiving the information of the three-dimensional shape and dividing the three-dimensional shape into at least two or more partial models; and
a work information generation unit generating work information for each of the partial models, and
the number of layer manufacturing apparatuses is plural, and the plurality of layer manufacturing apparatuses receive the work information from the electronic device, are individually allocated the partial models to be formed, and layer and form the partial models, respectively, to layer and form one three-dimensional shape.

3. The layering control system of claim 2, wherein
the layer manufacturing apparatuses are arranged side by side and sequentially form the individually allocated partial models to form the one three-dimensional shape.

4. The layering control system of claim 3, wherein
the transfer unit transfers the stage to the layer manufacturing apparatuses according to a formation order of the partial models.

5. The layering control system of claim 3, wherein
the division unit divides the three-dimensional shape into the partial models on the basis of an insertion direction of a nozzle to be inserted in the layer manufacturing apparatus, and
the electronic device allocates a partial model positioned in the insertion direction of the nozzle among the divided partial models to a layer manufacturing apparatus first forming a partial model among the plurality of the layer manufacturing apparatuses.

6. The layering control system of claim 2, wherein
at least one of the layer manufacturing apparatuses sprays a layered material different from that of another layer manufacturing apparatus.

7. The layering control system of claim 1, further comprising:
an external memory physically connectable to the electronic device or the layer manufacturing apparatus to store the work information for each of the partial models from the electronic device or to transfer the stored work information for each of the partial models to the layer manufacturing apparatus,
wherein the electronic device and the layer manufacturing apparatus further include, respectively, connectors formed so that the external memory is connectable thereto.

8. The layering control system of claim 1, wherein
the layer manufacturing apparatus includes a state information generation unit generating work state information or apparatus state information,
the state information generation unit transmits the generated information to the electronic device, and
the electronic device further includes a state information output unit receiving and outputting the work state information or the apparatus state information for each of the layer manufacturing apparatuses.

9. The layering control system of claim 1, wherein the layer manufacturing apparatus includes:
at least one or more head modules including a plurality of nozzles each spraying a layered material to form a three-dimensional shape;
a moving unit moving the head modules; and
a control unit controlling the head modules and the moving unit.

10. The layering control system of claim 9, wherein
the head module includes:
body portions provided in a number corresponding to the number of nozzles, each accommodating the layered material, and having one sides to which the nozzles are coupled;
packing portions inserted into the body portions so as to be movable along the body portions, respectively, and pushing the layered material to the nozzles according to the movement; and
a pressure source connected to each of a plurality of body portions through pressure lines and pushing the packing portions according to the supply of a pressure and allowing the nozzles to spray the layered material.

11. The layering control system of claim 2, wherein
the head module includes:
body portions provided in a number corresponding to the number of nozzles and having one sides to which the nozzles are coupled; and
a pressure tank accommodating the layered material, connected to each of a plurality of body portions through pressure lines, and supplying the layered material to the body portions to allow the nozzles to spray the layered material.

12. The layering control system of claim 11, wherein
the head module further includes a manifold connected to the pressure tank through a first pressure line to receive the layered material from the pressure tank, and connected to each of the plurality of body portions in parallel through second pressure lines to distribute the received layered material to the body portions.

13. The layering control system of claim 12, wherein
all of lengths of the second pressure lines are the same as each other.

14. The layering control system of claim 12, wherein
valves controlling whether or not to supply the layered material supplied to the body portions through the second pressure lines are provided in the manifold so as to correspond to the respective second pressure lines.

15. The layering control system of claim 9, wherein
the number of head modules is plural, the plurality of head modules are arranged side by side, and the transfer unit moves the stage so that the stage passes through the head modules arranged side by side.

16. The layering control system of claim 9, wherein
the moving unit includes an X-axis moving member, a Y-axis moving member, a Z-axis moving member, and an X-axis rail that move the head module in three directions orthogonal to each other, and
the X-axis moving member of the head module is coupled to one X-axis rail formed in the same direction as a direction in which the transfer unit transfers the stage.

17. The layering control system of claim 9, wherein the electronic device includes:
a division unit receiving the information of the three-dimensional shape and dividing the three-dimensional shape into at least two or more partial models; and
a work information generation unit generating work information for each of the partial models,
the number of head modules is plural, and
the control unit allocates the received work information for each of the partial models to each of the head modules, and the head modules form the allocated partial models, respectively, such that the plurality of head modules layer and form one three-dimensional shape.

18. The layering control system of claim 17, wherein
the division unit divides the three-dimensional shape into the partial models on the basis of an insertion direction of the nozzle, and
the control unit allocates a partial model positioned in the insertion direction of the nozzle among the divided partial models to a head module first forming a partial model among the plurality of head modules.

19. The layering control system of claim 2 or 17, wherein
the electronic device further includes a path optimization unit optimizing a path of the nozzle for each partial model divided by the division unit, and
the work information for each of the partial models generated by the work information generation unit includes path information of the nozzle calculated by the path optimization unit.

20. The layering control system of claim 19, wherein
the path optimization unit divides each partial model divided by the division unit into a plurality of layers layered on one side, recognizes a plurality of polygons included in each of the layers and spaced apart from each other, divides the plurality of polygons into a plurality of parts including polygons in contact with each other, and calculates the path information of the nozzle so that the nozzle sequentially form the plurality of parts.

21. The layering control system of claim 1, wherein
the number of head modules is plural, and at least one of the head modules sprays a layered material different from that of another head module.

22. The layering control system of claim 17, wherein
the electronic device further includes a path optimization unit optimizing a path of the nozzle for each partial model divided by the division unit, and
the work information for each of the partial models generated by the work information generation unit includes path information of the nozzle calculated by the path optimization unit.

23. The layering control system of claim 22, wherein
the path optimization unit divides each partial model divided by the division unit into a plurality of layers layered on one side, recognizes a plurality of polygons included in each of the layers and spaced apart from each other, divides the plurality of polygons into a plurality of parts including polygons in contact with each other, and calculates the path information of the nozzle so that the nozzle sequentially form the plurality of parts.

* * * * *